United States Patent
Ye et al.

(10) Patent No.: US 9,973,099 B2
(45) Date of Patent: May 15, 2018

(54) AC/DC CONVERTERS WITH WIDER VOLTAGE REGULATION RANGE

(71) Applicant: Futurewei Technologies, Inc., Plano, TX (US)

(72) Inventors: Liming Ye, Frisco, TX (US); Heping Dai, Plano, TX (US); Dianbo Fu, Plano, TX (US)

(73) Assignee: Futurewei Technologies, Inc., Plano, TX (US)

( * ) Notice: Subject to any disclaimer, the term of this patent is extended or adjusted under 35 U.S.C. 154(b) by 33 days.

(21) Appl. No.: 14/836,630

(22) Filed: Aug. 26, 2015

(65) Prior Publication Data
US 2017/0063251 A1    Mar. 2, 2017

(51) Int. Cl.
*H02M 3/335* (2006.01)
*H02M 7/483* (2007.01)
*H02M 1/00* (2006.01)

(52) U.S. Cl.
CPC ........ *H02M 3/33576* (2013.01); *H02M 7/483* (2013.01); *H02M 2001/0058* (2013.01); *Y02B 70/1491* (2013.01)

(58) Field of Classification Search
CPC .. H02M 7/219; H02M 3/33576; H02M 7/483; H02M 2001/0058
USPC ..................................... 363/17, 21.02–21.03
See application file for complete search history.

(56) References Cited

U.S. PATENT DOCUMENTS

| | | | | |
|---|---|---|---|---|
| 6,160,374 A * | 12/2000 | Hayes | ............... | H02J 7/025 320/108 |
| 6,301,128 B1 * | 10/2001 | Jang | ............... | H02J 5/005 363/127 |
| 6,934,167 B2 * | 8/2005 | Jang | ............... | H02J 5/005 363/21.02 |
| 7,177,163 B2 * | 2/2007 | Eguchi | ............... | H02M 3/33592 363/132 |
| 7,742,318 B2 * | 6/2010 | Fu | ............... | H02M 3/33592 363/16 |
| 7,796,406 B2 * | 9/2010 | Lev | ............... | H02M 3/33592 363/132 |
| 7,885,085 B2 * | 2/2011 | Orr | ............... | H02M 1/4225 363/21.02 |
| 8,018,206 B2 * | 9/2011 | Weigel | ............... | H01F 6/008 318/16 |

(Continued)

OTHER PUBLICATIONS

Received STIC search report from EIC 2800 searcher Benjamin Martin dated Sep. 15, 2016.*

(Continued)

*Primary Examiner* — Timothy J Dole
*Assistant Examiner* — Htet Z Kyaw
(74) *Attorney, Agent, or Firm* — Slater Matsil, LLP

(57) ABSTRACT

A converter is provided. The converter includes a first DC/DC converter, a non-isolated DC/DC converter and a control circuit. The first DC/DC converter includes a transformer, a primary side inverter and a secondary side rectifier. The primary side inverter and a secondary side rectifier are operable at multiple operating modes. The control circuit determines an operating mode for the primary side inverter or the secondary side rectifier, and controls the primary side inverter or the secondary side rectifier to change its respective operating mode.

39 Claims, 10 Drawing Sheets

(56) References Cited

U.S. PATENT DOCUMENTS

| | | | | |
|---|---|---|---|---|
| 8,102,164 B2* | 1/2012 | Colbeck | H02M 1/4225 | 323/271 |
| 8,149,599 B2* | 4/2012 | Coccia | H02M 3/33507 | 363/21.02 |
| 8,208,274 B2* | 6/2012 | Raju | H02M 3/33561 | 363/132 |
| 8,339,813 B2* | 12/2012 | Wang | H02M 1/4225 | 363/21.02 |
| 8,467,199 B2* | 6/2013 | Lee | H02M 3/33584 | 363/21.02 |
| 8,593,831 B2* | 11/2013 | Rojas | H02M 3/335 | 363/21.02 |
| 8,717,783 B2* | 5/2014 | Wang | H02M 3/33592 | 363/17 |
| 8,811,039 B2* | 8/2014 | The Ngo | H02M 3/33584 | 363/21.02 |
| 8,830,701 B2 | 9/2014 | Takegami | | |
| 8,854,839 B2* | 10/2014 | Cheng | H02M 1/4241 | 323/207 |
| 8,884,581 B2* | 11/2014 | Widmer | B60L 11/182 | 320/104 |
| 9,041,372 B2* | 5/2015 | Xie | H02M 3/1582 | 307/11 |
| 9,077,255 B2 | 7/2015 | Fu et al. | | |
| 9,281,753 B2* | 3/2016 | Reddy | H02M 3/3376 | |
| 9,356,523 B2* | 5/2016 | Yoshida | H02M 3/3576 | |
| 9,450,496 B2* | 9/2016 | Sigamani | H02M 3/33546 | |
| 9,455,641 B2* | 9/2016 | Kondo | H02M 3/33584 | |
| 9,490,704 B2* | 11/2016 | Jang | H02M 3/285 | |
| 9,515,562 B2* | 12/2016 | Dai | H02M 3/3353 | |
| 9,570,991 B2* | 2/2017 | Akutagawa | H02M 3/33584 | |
| 9,608,539 B2* | 3/2017 | Ichinose | H02M 7/219 | |
| 2005/0237771 A1* | 10/2005 | Franck | H02M 1/4233 | 363/84 |
| 2007/0041222 A1* | 2/2007 | Eguchi | H02M 1/10 | 363/17 |
| 2007/0070655 A1* | 3/2007 | Eguchi | H02M 1/10 | 363/17 |
| 2009/0034299 A1* | 2/2009 | Lev | H02M 3/33592 | 363/17 |
| 2009/0059622 A1* | 3/2009 | Shimada | H02M 3/33584 | 363/17 |
| 2009/0153106 A1 | 6/2009 | Weigel | H01F 6/008 | 322/59 |
| 2010/0026208 A1* | 2/2010 | Shteynberg | H05B 33/0815 | 315/297 |
| 2010/0182803 A1* | 7/2010 | Nan | H02M 3/33592 | 363/21.02 |
| 2011/0032734 A1* | 2/2011 | Melanson | H02M 1/14 | 363/37 |
| 2011/0085354 A1* | 4/2011 | Wang | H02M 1/4225 | 363/21.02 |
| 2011/0090717 A1* | 4/2011 | Lee | H02M 3/33584 | 363/21.02 |
| 2011/0103098 A1* | 5/2011 | Wu | H02M 1/36 | 363/17 |
| 2011/0285349 A1* | 11/2011 | Widmer | B60L 11/182 | 320/108 |
| 2012/0008348 A1* | 1/2012 | Chapman | H02M 3/33523 | 363/37 |
| 2012/0013268 A1* | 1/2012 | Chou | H02M 1/4225 | 315/301 |
| 2012/0026755 A1* | 2/2012 | Wu | H02M 3/33592 | 363/17 |
| 2012/0032633 A1* | 2/2012 | Cordes | B60L 11/1803 | 320/108 |
| 2012/0127765 A1* | 5/2012 | Maruyama | H02J 5/005 | 363/126 |
| 2012/0161696 A1* | 6/2012 | Cook | B60L 11/182 | 320/108 |
| 2012/0294045 A1* | 11/2012 | Fornage | H02M 7/217 | 363/17 |
| 2013/0044519 A1* | 2/2013 | Teraura | H02M 3/33584 | 363/17 |
| 2013/0135903 A1* | 5/2013 | Fu | H02M 3/3374 | 363/17 |
| 2014/0036545 A1* | 2/2014 | Reddy | H02M 3/3376 | 363/17 |
| 2014/0160799 A1* | 6/2014 | Gu | H02M 3/156 | 363/17 |
| 2014/0160805 A1* | 6/2014 | Oh | H02M 3/33507 | 363/21.02 |
| 2014/0192560 A1* | 7/2014 | Ou | H02M 1/40 | 363/16 |
| 2014/0225439 A1* | 8/2014 | Mao | H02M 3/3376 | 307/31 |
| 2014/0266135 A1* | 9/2014 | Zhak | H02M 1/36 | 323/311 |
| 2014/0268897 A1* | 9/2014 | Zimmanck | H02M 3/3353 | 363/17 |
| 2014/0292092 A1* | 10/2014 | Ichinose | H02J 5/005 | 307/104 |
| 2014/0372780 A1* | 12/2014 | Murai | G06F 1/3287 | 713/323 |
| 2015/0023063 A1* | 1/2015 | Perreault | H02M 3/337 | 363/17 |
| 2015/0023079 A1* | 1/2015 | Sawada | H02J 5/005 | 363/127 |
| 2015/0049515 A1* | 2/2015 | Zhao | H02M 3/3376 | 363/17 |
| 2015/0078036 A1* | 3/2015 | Jovanovic | H02M 1/10 | 363/17 |
| 2015/0097546 A1* | 4/2015 | Pan | H02M 3/158 | 323/311 |
| 2015/0131337 A1* | 5/2015 | Gabrielsson | H02M 1/4241 | 363/21.03 |
| 2015/0180345 A1* | 6/2015 | Frost | H02M 3/3376 | 363/17 |
| 2015/0229200 A1* | 8/2015 | Schwartz | H02M 3/3376 | 363/21.03 |
| 2015/0229225 A1* | 8/2015 | Jang | H02M 3/285 | 363/17 |
| 2015/0295497 A1* | 10/2015 | Perreault | H02M 3/3376 | 363/21.03 |
| 2015/0311814 A1* | 10/2015 | Stolt | H02M 5/458 | 363/37 |
| 2016/0126844 A1* | 5/2016 | Tschirhart | H02M 3/33592 | 363/17 |
| 2016/0134120 A1* | 5/2016 | Ewig | H02M 3/04 | 307/82 |
| 2016/0176300 A1* | 6/2016 | Bucher | B60L 11/182 | 307/104 |
| 2016/0181871 A1* | 6/2016 | Krumme | A61B 6/03 | 307/104 |
| 2016/0190933 A1* | 6/2016 | Lee | H02M 3/33507 | 363/17 |
| 2016/0294296 A1* | 10/2016 | Lee | H02M 1/4258 | |
| 2016/0294298 A1* | 10/2016 | Wong | H02M 3/33592 | |
| 2016/0315501 A1* | 10/2016 | Long | H02J 3/38 | |
| 2016/0336808 A1* | 11/2016 | Liu | H02M 7/219 | |
| 2017/0018965 A1* | 1/2017 | Lee | H02J 50/80 | |
| 2017/0040846 A1* | 2/2017 | Sankar | H03H 7/40 | |
| 2017/0085183 A1* | 3/2017 | Notsch | H02M 3/33507 | |

OTHER PUBLICATIONS

Received STIC search report from EIC 2800 searcher Benjamin Martin dated Sep. 27, 2016.*

"An introduction to LLC resonant half-bridge converter," AN2644, Application note, Sep. 2008, 64 pages.

Cocia, et al., "Wide input Voltage range Compensation in DC/DC Resonant Architectures for On-Board Traction Power Supplies," IEEE, Date of Conference Sep. 2-5, 2007, 10 pages.

Jovanovic, et al., "Efficiency Optimization of LLC Resonant Converters Operating in Wide Input-and/or Output voltage Range by On-the-Fly Topology-Morphing Control," IEEE, Date of Conference Mar. 15-19, 2015, 8 pages.

(56) References Cited

OTHER PUBLICATIONS

Liang, et al., "A New Wide Input Range High Efficiency Photovoltaic Inverter," IEEE, Date of Conference Sep. 12-16, 2010, 7 pages.

Microsemi, "Part 1: Overview of the Transition from Conventional PWM Power Conversion to Resonant Topologies," Mar. 2013, 33 pages.

\* cited by examiner

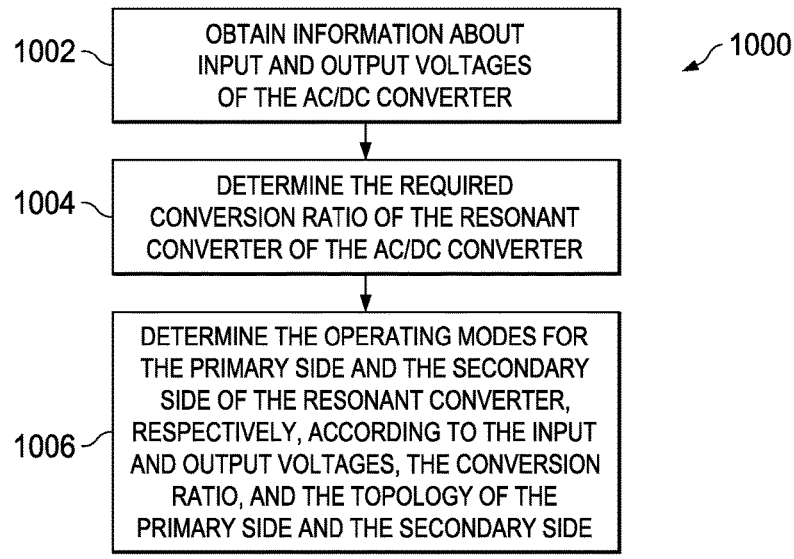
FIG. 10
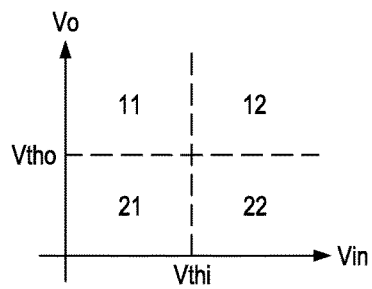
FIG. 11A
| | INPUT VOLTAGE SUB-RANGE 1 | INPUT VOLTAGE SUB-RANGE 2 |
|---|---|---|
| OUTPUT VOLTAGE SUB-RANGE 1 | VCRtot = 2<br>PRI: FULL-BRIDGE<br>SEC: HALF-BRIDGE<br>REGION 11 | VCRtot = 1<br>PRI: FULL-BRIDGE<br>SEC: FULL-BRIDGE<br>REGION 12 |
| OUTPUT VOLTAGE SUB-RANGE 2 | VCRtot = 1<br>PRI: FULL-BRIDGE<br>SEC: FULL-BRIDGE<br>REGION 21 | VCRtot = 1/2<br>PRI: HALF-BRIDGE<br>SEC: FULL-BRIDGE<br>REGION 22 |
FIG. 11B

|  | INPUT VOLTAGE SUB-RANGE 1 | INPUT VOLTAGE SUB-RANGE 2 |
| --- | --- | --- |
| OUTPUT VOLTAGE SUB-RANGE 1 | VCRtot = 2<br>PRI: TWO-LEVEL HALF-BRIDGE<br>SEC: THREE-LEVEL HALF-BRIDGE<br>REGION 11 | VCRtot = 1<br>PRI: THREE-LEVEL HALF-BRIDGE<br>SEC: THREE-LEVEL HALF-BRIDGE<br>REGION 12 |
| OUTPUT VOLTAGE SUB-RANGE 2 | VCRtot = 1<br>PRI: THREE-LEVEL HALF-BRIDGE<br>SEC: THREE-LEVEL HALF-BRIDGE<br>REGION 21 | VCRtot = 1/2<br>PRI: THREE-LEVEL HALF-BRIDGE<br>SEC: TWO-LEVEL HALF-BRIDGE<br>REGION 22 |

FIG. 11C

|  | INPUT VOLTAGE SUB-RANGE 1 | INPUT VOLTAGE SUB-RANGE 2 |
| --- | --- | --- |
| OUTPUT VOLTAGE SUB-RANGE 1 | VCRtot = 1<br>PRI: TWO-LEVEL HALF-BRIDGE<br>SEC: HALF-BRIDGE | VCRtot = 1/2<br>PRI: TWO-LEVEL HALF-BRIDGE<br>SEC: FULL-BRIDGE |
| OUTPUT VOLTAGE SUB-RANGE 2 | VCRtot = 1/2<br>PRI: TWO-LEVEL HALF-BRIDGE<br>SEC: FULL-BRIDGE | VCRtot = 1/4<br>PRI: THREE-LEVEL HALF-BRIDGE<br>SEC: FULL-BRIDGE |

FIG. 11D

|  | INPUT VOLTAGE SUB-RANGE 1 | INPUT VOLTAGE SUB-RANGE 2 |
| --- | --- | --- |
| OUTPUT VOLTAGE SUB-RANGE 1 | VCRtot = 4<br>PRI: FULL-BRIDGE<br>SEC: THREE-LEVEL HALF-BRIDGE | VCRtot = 2<br>PRI: FULL-BRIDGE<br>SEC: TWO-LEVEL HALF-BRIDGE |
| OUTPUT VOLTAGE SUB-RANGE 2 | VCRtot = 2<br>PRI: FULL-BRIDGE<br>SEC: TWO-LEVEL HALF-BRIDGE | VCRtot = 1<br>PRI: HALF-BRIDGE<br>SEC: TWO-LEVEL HALF-BRIDGE |

FIG. 11E

AC/DC CONVERTERS WITH WIDER VOLTAGE REGULATION RANGE

TECHNICAL FIELD

The present invention relates generally to AC/DC converters, and, in particular embodiments, to AC/DC converters operating with wide voltage regulation ranges.

BACKGROUND

An AC/DC converter is designed to convert an alternating current ("AC") mains voltage to a regulated direct current ("DC") output voltage to power an electronic load such as a tablet, printer, modem, cell phone, or personal computer. In many applications, an AC/DC converter is required to operate with a wide input-output voltage range. For example, electricity supply voltage varies in different countries. China has a supply voltage between 220 v and 230 v, and the U.S. supply voltage is between 110 v and 130 v. A laptop that can work in both countries needs to have a universal AC/DC adapter that is able to operate with the supply voltage ranges of both countries. Further, as new technologies and applications emerge, such as the quick charge (QC) 2.0 of Qualcomm and USB Type C connectors, an AC/DC converter may be required to operate with a wide output voltage range. It is well understood, however, conversion efficiency of an AC/DC converter drops significantly when regulating an output voltage at very wide input and output voltage ranges. Further, an AC/DC converter usually operates at a low switching frequency, and the power density is also low. An AC/DC converter that can operate with wide input and output voltage ranges without suffering from reduced efficiency and low power density is desired.

SUMMARY

Technical advantages are generally achieved, by embodiments of this disclosure which describe an AC/DC converter that may operate with wide input and output voltage ranges.

In accordance with an embodiment, a converter including a first DC/DC converter, a second non-isolated DC/DC converter, and a control circuit is provided. The first DC/DC converter includes a transformer, a primary side inverter coupled to the primary side of the transformer, and a secondary side rectifier coupled to the secondary side of the transformer, where the primary side inverter or the secondary side rectifier operates at multiple operating modes. The second non-isolated DC/DC converter is coupled to the first DC/DC converter, and the control circuit is also coupled to the first DC/DC converter. The control circuit is configured to determine an operating mode for the primary side inverter or the secondary side rectifier, and change the operating mode of the primary side inverter or the secondary side rectifier. A method is also provided for changing the operating mode of the primary side inverter or the secondary side rectifier. The first DC/DC converter may be a resonant converter, a multi-level bridge converter, or a cascaded converter. In one embodiment, the primary side inverter or the secondary side rectifier may include a plurality of switches and at least one mode controlling switch by which the primary side inverter or the secondary side rectifier changes from a first operating mode to a second operating mode.

In accordance with another embodiment, a circuit including a capacitor and a bridge rectifier is provided. The capacitor is coupled to a first input node, and the bridge rectifier is coupled to the capacitor and a second input node, where the bridge rectifier is operable at multiple operating modes including a full-bridge mode and a half-bridge mode. In one embodiment, the bridge rectifier includes a plurality of switches and at least one mode controlling switch by which the bridge rectifier switches from a first operating mode to a second operating mode.

In accordance with yet another embodiment, a circuit including a capacitor and a multi-level half-bridge rectifier is provided. The capacitor is coupled to a first input node, and the multi-level half-bridge rectifier is coupled to the capacitor and a second input node, where the multi-level half-bridge rectifier is operable at multiple operating modes including a two-level half-bridge mode and a three-level half-bridge mode. In one embodiment, the multi-level half-bridge rectifier includes a plurality of switches and at least one mode controlling switch by which the multi-level half-bridge rectifier switches from a first operating mode to a second operating mode.

In accordance with yet another embodiment, a method is provided. The method provides a signal to a converter that includes a bridge rectifier coupled to the secondary side of a transformer and operable at multiple operating modes, and switches the bridge rectifier from a first operating mode to a second operating mode.

BRIEF DESCRIPTION OF THE DRAWINGS

For a more complete understanding of the present invention, and the advantages thereof, reference is now made to the following descriptions taken in conjunction with the accompanying drawings, in which:

FIG. 10 illustrates a flow chart of an embodiment method for determining operating modes for the primary side and secondary side of the resonant converter of an AC/DC converter;

FIG. 11A illustrates an embodiment 2*2 input voltage and output voltage sub-ranges;

FIG. 11B illustrates an embodiment 2*2 voltage conversion ratio table;

FIG. 11C illustrates another embodiment 2*2 voltage conversion ratio table;

FIG. 11D illustrates another embodiment 2*2 voltage conversion ratio table;

FIG. 11E illustrates another embodiment 2*2 voltage conversion ratio table; and

DETAILED DESCRIPTION OF ILLUSTRATIVE EMBODIMENTS

The making and using of embodiments of this disclosure are discussed in detail below. It should be appreciated, however, that the concepts disclosed herein can be embodied in a wide variety of specific contexts, and that the specific embodiments discussed herein are merely illustrative and do not serve to limit the scope of the claims. Further, it should be understood that various changes, substitutions and alterations can be made herein without departing from the spirit and scope of this disclosure as defined by the appended claims.

Aspects of the present disclosure provide an AC/DC converter that includes a first DC/DC converter including a transformer, a non-isolated DC/DC converter and a control circuit. The first DC/DC converter may be a bridge type converter and further include a primary side inverter coupled to the primary side of the transformer, and a secondary side rectifier coupled to the secondary side of the transformer, where the primary side inverter and the secondary side rectifier are capable of operating at multiple operating modes. The control circuit is configured to determine an operating mode for the primary side inverter or the secondary side rectifier, and is able to switch the primary side inverter or the secondary side rectifier from one operating mode to a different operating mode. By changing the operating modes of the primary side inverter and the secondary rectifier, the first DC/DC converter may produce multiple ranges of voltage conversion ratios, and achieve a high efficiency voltage conversion when the AC/DC converter is operating in wide input and output voltage ranges. Aspects of the present disclosure also provide embodiments of the first DC/DC converter which includes a primary side inverter and a secondary side rectifier operable at multiple operating modes. Aspects of the present disclosure further provide an embodiment method for switching the secondary side rectifier from one operating mode to a different operating mode, and a method for determining an operating mode for the primary side inverter or the secondary side rectifier.

Figure 1:
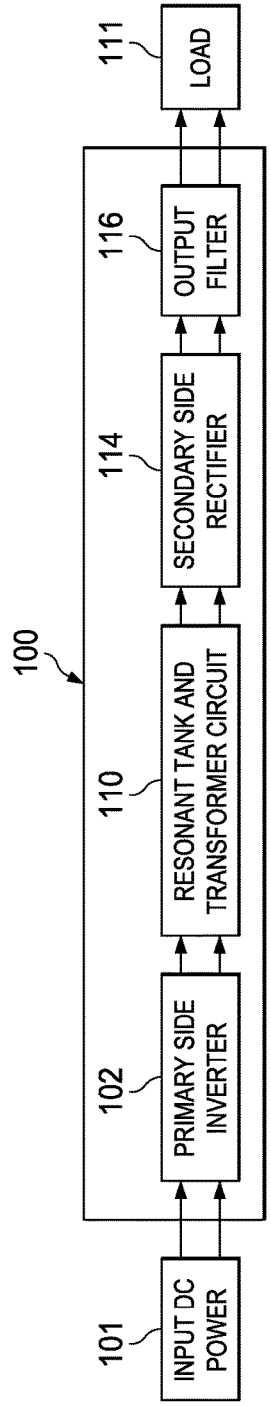
FIG. 1 illustrates a block diagram of an embodiment resonant converter.

FIG. 1 illustrates a block diagram of an embodiment resonant converter 100. The resonant converter 100 is coupled between an input DC power source 101 and a load 111. The input DC power source 101 may be telecommunication power supplies converting a utility line voltage to a DC voltage. Alternatively, the input DC power source 101 may be a solar panel array. Furthermore, the input DC power source 101 may be an energy storage device such as rechargeable batteries, fuel cells and/or the like. The load 111 represents the power consumed by a circuit coupled to the resonant converter 100. Alternatively, the load 111 may refer to downstream converters coupled to the output of the resonant converter 100.

The resonant converter 100 may comprise a primary side inverter 102, a resonant tank and transformer circuit 110, a secondary side rectifier 114 and an output filter 116. As shown in FIG. 1, the primary side inverter 102, the resonant tank and transformer circuit 110, the secondary side rectifier 114 and the output filter 116 are coupled to each other and connected in cascade between the input DC power source 101 and the load 111.

The primary side inverter 102 is coupled at the primary side of the resonant tank and transformer circuit 110 and converts a DC voltage into a rectangular waveform with an alternating voltage polarity across the resonant tank and transformer circuit 110. The primary side inverter 102 may be an inverter of a full-bridge resonant converter according to some embodiments. Alternatively, the primary side inverter 102 may be an inverter of a half-bridge resonant converter, a multi-level resonant converter, and/or the like. In some embodiments, the primary side inverter 102 may include switches in a topology that allows the primary side inverter 102 to operate at different operating modes. For example, the primary side inverter 102 may switch between a half-bridge mode and a full-bridge mode.

In accordance with some embodiments, the resonant tank and transformer circuit 110 may include a resonant tank and a transformer. The transformer of the resonant tank and transformer circuit 110 provides electrical isolation between its primary side and secondary side. In accordance with an embodiment, the transformer may be formed of two transformer windings, namely a primary transformer winding and a secondary transformer winding. Alternatively, the transformer may have a center tapped secondary so as to have three transformer windings including a primary transformer winding, a first secondary transformer winding and a second secondary transformer winding.

It should be noted that the transformers described above and throughout the description are merely examples, which should not unduly limit the scope of the claims. One of ordinary skill in the art would recognize many variations, alternatives, and modifications. For example, the transformer may further comprise a variety of bias windings and gate drive auxiliary windings.

In accordance with some embodiments, the resonant tank of the resonant tank and transformer circuit 110 may be coupled to the primary winding of the transformer. Alternatively, the resonant tank may be coupled at the secondary side of the transformer between the secondary winding and the secondary side rectifier 114. The resonant tank may be implemented in a variety of ways. In some embodiments, the resonant tank includes three key resonant elements, namely a series resonant inductor, a series resonant capacitor and a parallel resonant inductor. A converter with such a configuration is commonly referred to as an LLC resonant converter for having two inductors and one capacitor. According to the operating principle of LLC resonant converters, at a switching frequency approximately equal to the resonant frequency of the resonant tank, the resonant tank helps to achieve zero voltage switching and zero current switching for both the primary side and the secondary side switching elements. Alternatively, the resonant tank may comprise a multiple element resonant tank such as an LCLCL resonant tank, an LCCL resonant tank and/or the like. The series resonant inductor and the parallel resonant inductor may be implemented as external inductors. One of ordinary skill in the art would recognize that there may be many variations, alternatives and modifications. For example, the series resonant inductor may be implemented as a leakage inductance of the transformer.

The secondary side rectifier 114 is coupled to the secondary side of the resonant tank and transformer circuit 110, and converts an alternating polarity waveform received from the output of the resonant tank and transformer circuit 110 to a single polarity waveform. The secondary side rectifier 114 may have a topology that allows the secondary side rectifier 114 to operate at multiple operating modes. For example, the secondary side rectifier 114 may have a topology of a bridge rectifier and may operate at a full-bridge mode and a half-bridge mode. Alternatively, the secondary side rectifier 114 may have a multi-level topology and may switch between multi-level modes, and/or the like.

The output filter 116 is used to attenuate the switching ripple of the resonant converter 200. According to the operation principles of isolated DC/DC converters, the output filter 116 may be an L-C filter formed by an inductor and a plurality of capacitors. One of ordinary skill in the art would recognize that some isolated DC/DC converters such as forward converters may require an L-C filter. On the other hand, some isolated DC/DC converters such as LLC resonant converters may include an output filter formed by a capacitor. One of ordinary skill in the art would further recognize that different output filter configurations apply to different power converter topologies as appropriate. The configuration variations of the output filter 116 are within various embodiments of the present disclosure. Throughout this disclosure, the term "isolated DC/DC converter" refers to a DC/DC converter that includes a transformer that is used to provide electrical isolation between the primary side and the secondary side of the transformer.

Figure 2A:
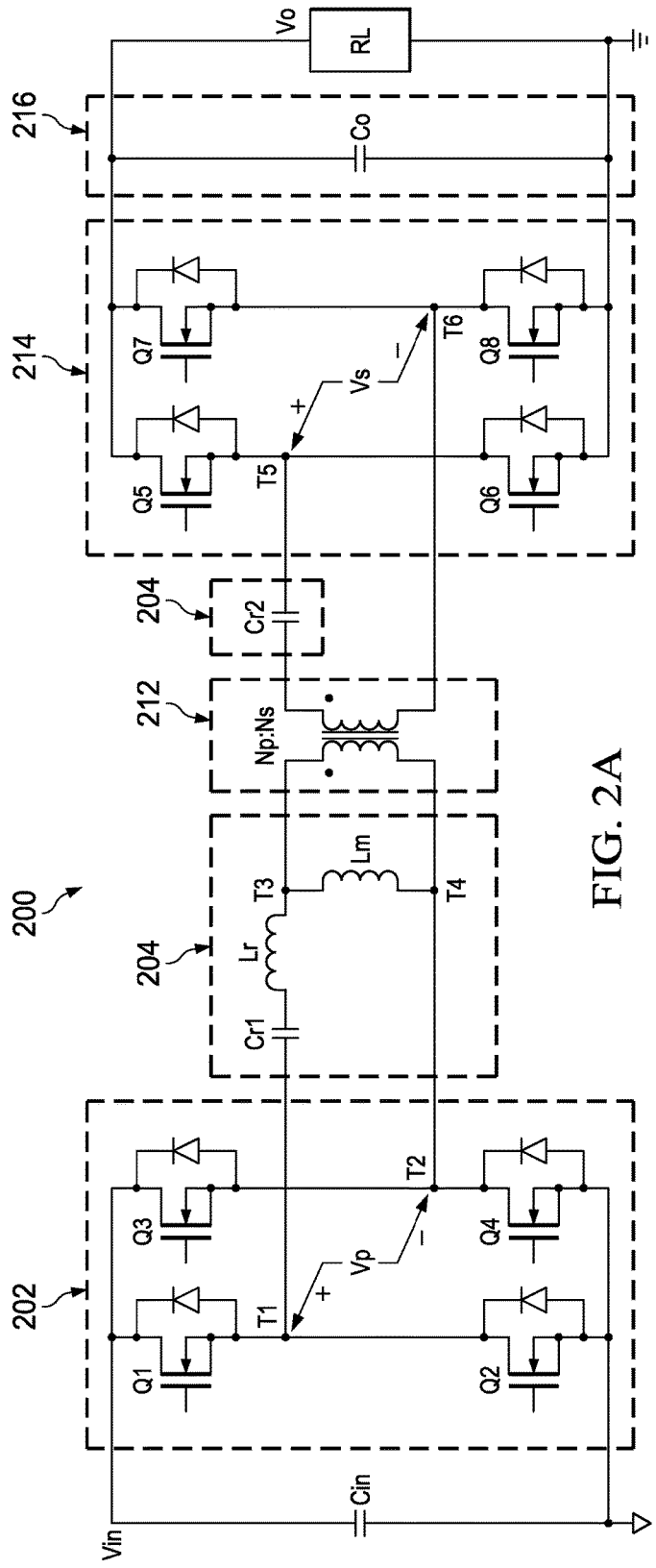
FIG. 2A illustrates a schematic diagram of an embodiment resonant converter.

FIG. 2A illustrates a schematic diagram of an embodiment resonant converter 200. As shown, the resonant converter 200 comprises a primary side inverter 202, a resonant tank 204, a transformer 212, a secondary side rectifier 214 and an output filter 216. Components of the resonant converter 200 may be configured similarly to the corresponding components of the resonant converter 100. The primary side inverter 202 is coupled in parallel to an input capacitor Cin. The input capacitor may be used as an input filter to absorb pulsating current that would otherwise be drawn from the input DC source. The primary side inverter 202, as shown, is a bridge inverter and includes four switching elements, namely Q1, Q2, Q3 and Q4. As shown in FIG. 2A, a first pair of switching elements Q1 and Q2 are connected in series. A second pair of switching elements Q3 and Q4 are connected in series. The first pair and the second pair of switching elements are connected in parallel. The common node of the switching elements Q1 and Q2 is coupled to a first input terminal T1 of the resonant tank 204. Likewise, the common node of the switching elements Q3 and Q4 is coupled to a second input terminal T2 of the resonant tank 204. Throughout this disclosure, the terms "switching element" and "switch" are used interchangeably.

The switching elements Q1, Q2, Q3 and Q4 may be configured in the form of a full-bridge inverter or a half-bridge inverter. Alternatively, the switching elements Q1, Q2, Q3 and Q4 may be configured as a bridge inverter that can operate at multiple operating modes, such as a half-bridge mode and a full-bridge mode. Control mechanism may be applied to switch the bridge inverter from one operating mode to a different operating mode. According to some embodiments, switching elements Q1, Q2, Q3 and Q4 are implemented as metal oxide semiconductor field effect transistors (MOSFETs). According to alternative embodiments, these primary side switches (e.g., switch Q1) may be an insulated gate bipolar transistor (IGBT) device. Alternatively, the primary side switches can be any controllable switches such as integrated gate commutated thyristor (IGCT) devices, gate turn-off thyristor (GTO) devices, silicon controlled rectifier (SCR) devices, junction gate field-effect transistor (JFET) devices, MOS controlled thyristor (MCT) devices, gallium nitride (GaN) based power devices and/or the like.

FIG. 2A further illustrates that the resonant tank 204 is coupled between the primary side inverter 202 and the transformer 212. The resonant tank 204 is formed by a series resonant capacitor Cr1, a series resonant inductor Lr, and a parallel inductance Lm at the primary side of the transformer 212, and a series resonant capacitor Cr2 at the secondary side of the transformer 212. The resonant converter 200 with such a resonant tank may be named as an LLCC resonant converter for its resonant tank includes two inductors and two capacitors.

As shown in FIG. 2A, the series resonant inductor Lr and the series resonant capacitor Cr1 are connected in series and further coupled to the primary side of the transformer 212. The series resonant capacitor Cr2 is connected in series to a first terminal of the secondary winding of the transformer 212. The series resonant capacitors Cr1 and Cr2 form the resonant capacitance of the resonant tank 104. The series resonant capacitor Cr1 also works as a DC-blocking capacitor for the primary side circuit of the resonant converter 200. Similarly, the series resonant capacitor Cr2 also works as a DC-blocking capacitor for the secondary side circuit of the resonant converter 200. The resonant tank frequency may be represented by $$fr = \frac{1}{2\pi\sqrt{Lr \cdot (Cr1 + Cr2 \cdot Ns^2/Np^2)}},$$

where Np is the number of turns of a primary winding of the transformer 212, and Ns is the number of turns of a secondary winding of the transformer 212.

It should be noted while FIG. 2A shows the series resonant inductor Lr is an independent component, the series resonant inductor Lr may be replaced by the leakage inductance of the transformer 212. In other words, the leakage inductance (not shown) may function as the series resonant inductor Lr.

The transformer 212 may be of a primary winding with Np turns and a secondary winding with Ns turns. The primary winding is coupled to terminals T3 and T4 of the resonant tank 204 as shown in FIG. 2A. The secondary winding is coupled to the output filter 216 through the series resonant capacitor Cr2 and the secondary side rectifier 214.

The secondary side rectifier 214 converts an AC voltage across the secondary side of the resonant tank 204 into a DC voltage. As shown in FIG. 2A, the secondary side rectifier 214 is a bridge rectifier and includes four switches Q5, Q6, Q7 and Q8. Switches Q5 and Q6 are connected in series and further coupled between two terminals of an output capacitor Co which functions as the output filter 216. Switches Q7 and Q8 are connected in series and further coupled between the two terminals of the output capacitor Co. The common node T5 of the switches Q5 and Q6 is coupled to a terminal of the series resonant capacitor Cr2, and the common node T6 of the switches Q7 and Q8 is coupled to a second terminal of the secondary winding of the transformer 212.

Figure 2B:
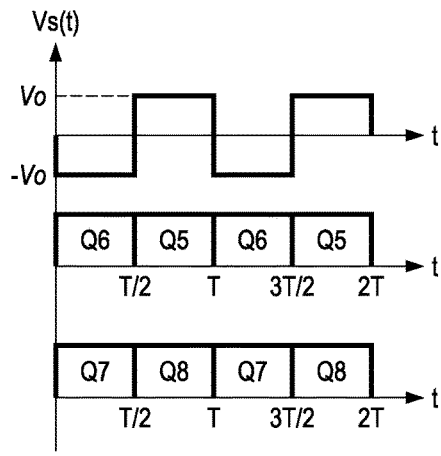
FIG. 2B illustrates a switching waveform of a voltage Vs of the resonant converter in FIG. 2A, and a timing diagram of the gate drive signals for the secondary side switches of the resonant converter when the secondary side rectifier of the resonant converter operates at a full-bridge mode.

The resonant converter 200 may be regulated through configuring the secondary side rectifier 214 to operate at different operating modes, such as a full-bridge mode and a half-bridge mode in this embodiment for the secondary side rectifier 214 has a half-bridge and full-bridge topology. When operating at the full-bridge mode, switches Q5 and Q6 are alternately turned on and off, and switches Q7 and Q8 are alternately turned on and off. FIG. 2B illustrates a switching waveform of a voltage Vs across the nodes T5 and T6, and a timing diagram of the gate drive signals of switches Q5, Q6, Q7 and Q8 when the secondary side rectifier 214 operates at the full-bridge mode. The horizontal axis of FIG. 2B represents intervals of time, and FIG. 2B shows four successive time intervals with an alternating period T. The resonant tank frequency is 1/T. As shown, the output voltage Vo is equal to the peak amplitude of the voltage Vs across the nodes T5 and T6. The voltage conversion ratio of the secondary side rectifier 214 may be defined as a ratio of the output voltage Vo of the resonant converter 200 to a half of the peak-to-peak value of the voltage Vs, and thus the voltage conversion ratio of the secondary side rectifier 214 in the full-bridge mode is 1. FIG. 2B further shows that switches Q5 and Q8 work in phase and Q6 and Q7 work in phase, and the switches Q5, Q6, Q7 and Q8 each has a 50% duty cycle.

Figure 2C:
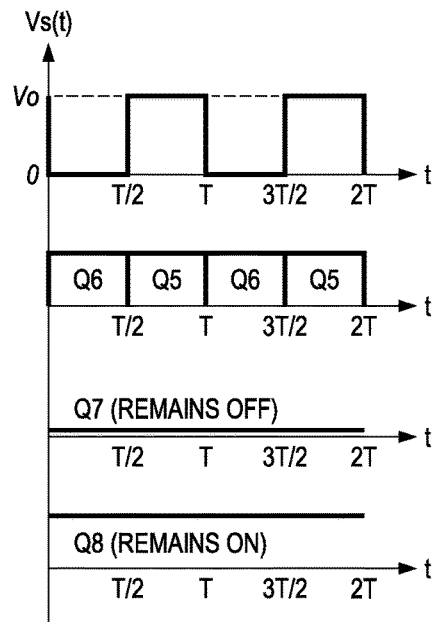
FIG. 2C illustrates a switching waveform of a voltage Vs of the resonant converter in FIG. 2A, and a timing diagram of the gate drive signals for the secondary side switches of the resonant converter when the secondary side rectifier of the resonant converter operates at a half-bridge mode.

When the secondary side rectifier 214 is operating at the half-bridge mode, according to one embodiment as shown in FIG. 2C, switches Q5 and Q6 are turned on or off alternately each with a 50% duty cycle, while switch Q8 is always on and Q7 is always off. In this case, Q8 is a mode controlling switch. Alternatively, switches Q5 and Q6 may switch on and off with a 50% duty cycle, Q8 is always off and Q7 is always on, in which case, Q7 is a mode controlling switch. FIG. 2C illustrates a switching waveform of the voltage Vs across the nodes T5 and T6, and a timing diagram of the gate drive signals of switches Q5, Q6, Q7 and Q8 in the half-bridge mode configuration. As shown, the output voltage Vo of the resonant converter 200 is two (2) times of the amplitude of the voltage Vs across the nodes T5 and T6. The voltage conversion ratio of the secondary side rectifier 214 operating at the half-bridge mode is 2.

To switch between different operating modes, one of the switches Q5, Q6, Q7 and Q8 may be used as a mode controlling switch, by which the secondary side rectifier 214 may switch from one operating mode to a different operating mode, thus operating at the full-bridge mode or the half-bridge mode. The mode controlling switch may be implemented by a controllable switch. For example, Q8, as shown in FIG. 2C, is the mode controlling switch and may be implemented by a controllable switch, while the other switches, namely switches Q5, Q6 and Q7, which are the non-mode controlling switches, may be implemented by rectifier diodes. Alternatively, all of the switches Q5, Q6, Q7 and Q8 may be implemented as controllable switches.

Figure 3:
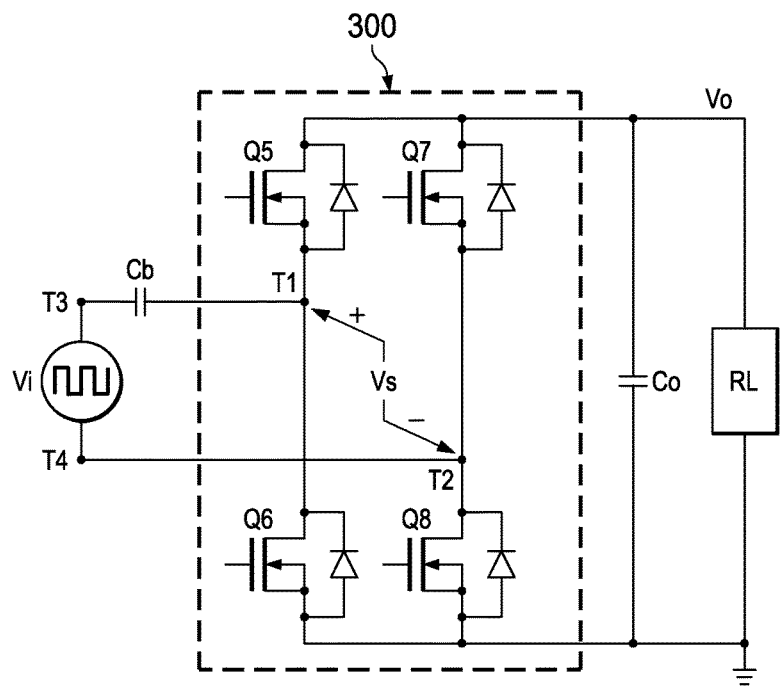
FIG. 3 illustrates a schematic diagram of an embodiment rectifier.

FIG. 3 illustrates a schematic diagram of an embodiment AC/DC rectifier 300 operable at multiple operating modes. In one embodiment, the AC/DC rectifier 300 may be used as a rectifier in DC/DC converter. As shown, the AC/DC rectifier 300 is coupled to an input AC power source Vi through a DC blocking capacitor Cb. The input AC power source Vi may be an AC power supply supplying an AC voltage. Alternatively, the input AC power source Vi may be an output AC voltage of an upstream circuit of the AC/DC rectifier circuit 300.

As shown, the AC/DC rectifier 300 has a half-bridge and full-bridge topology similar to the secondary side rectifier illustrated in FIG. 2A. The AC/DC rectifier 300 includes four switches Q5, Q6, Q7 and Q8. Switches Q5 and Q6 are connected in series and further coupled between two terminals of an output capacitor Co which functions as an output filter of the AC/DC rectifier 300. Switches Q7 and Q8 are connected in series and further coupled between the two terminals of the output capacitor Co. The common node T1 of the switches Q5 and Q6 is coupled to a terminal of the DC blocking capacitor Cb, which is further coupled to a first input node T3 of the input AC power source Vi. The common node T2 of the switches Q7 and Q8 is coupled to a second input node T4 of the input AC power source Vi. Similar to the discussion with respect to FIG. 2A, the AC/DC rectifier 300 may operate at multiple operating modes according to its topology, i.e., a half-bridge mode and a full-bridge mode. One of the switches Q5, Q6, Q7 and Q8 may be used as a mode controlling switch, by which the AC/DC rectifier 300 may switch between the full-bridge mode and the half-bridge mode. The mode controlling switch may be implemented by a controllable switch, while other switches may be implemented by rectifier diodes. Alternatively, all of the switches Q5, Q6, Q7 and Q8 may be implemented as controllable switches. The AC/DC rectifier 300 may also have a topology of other bridge type rectifiers and be configured to operate at multiple operating modes.

FIG. 3 also shows that the capacitor Co is further coupled to a load RL. The load RL represents the power consumed by a circuit coupled to the capacitor Co. Alternatively, the load RL may refer to downstream circuits coupled to the capacitor Co.

Figure 4A:
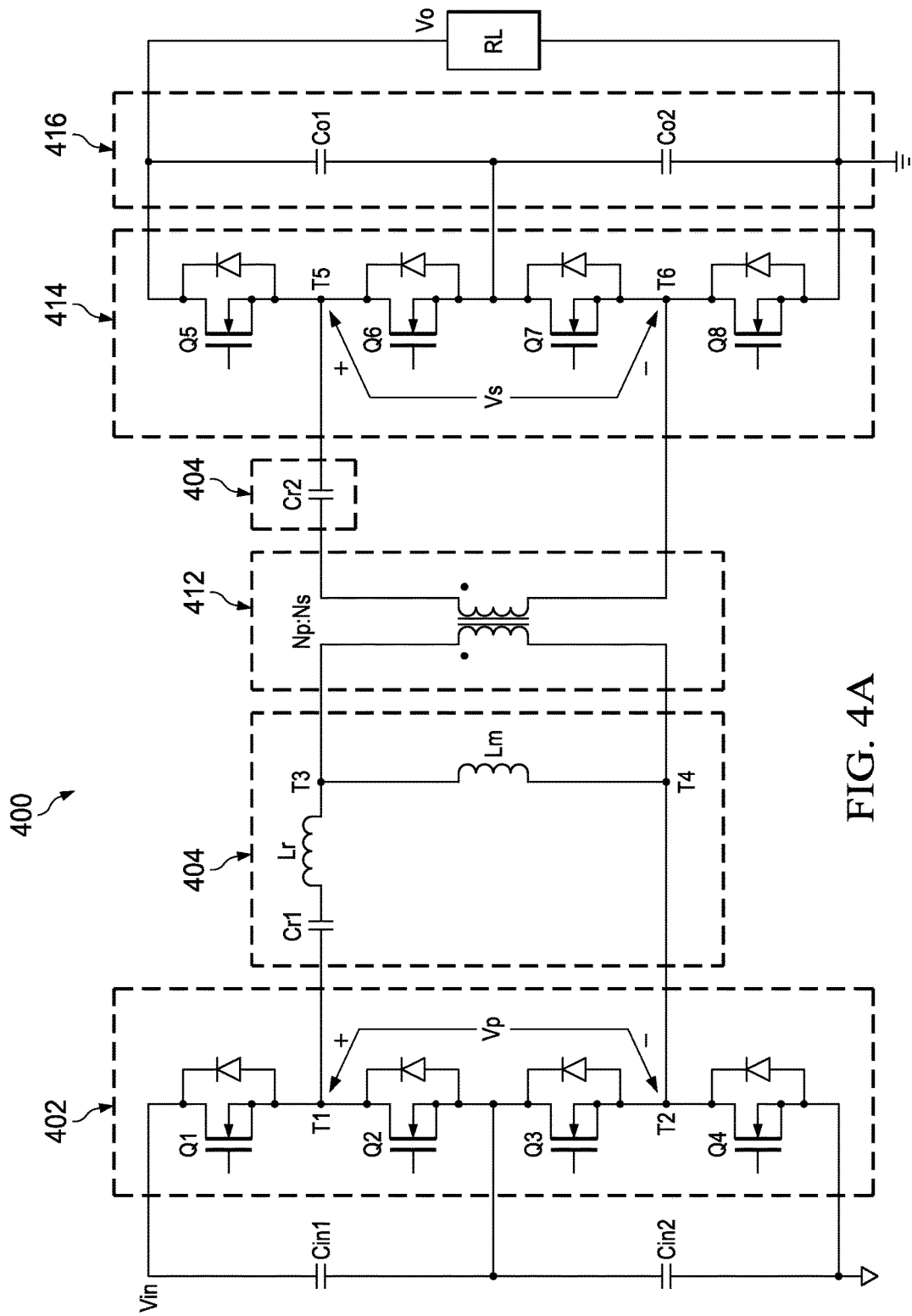
FIG. 4A illustrates a schematic diagram of yet another embodiment resonant converter.

FIG. 4A illustrates a schematic diagram of yet another embodiment resonant converter 400. As shown, the resonant converter 400 comprises a primary side inverter 402, a resonant tank 404, a transformer 412, a secondary side rectifier 414 and an output filter 416. Components of the resonant converter 400 may be configured similarly to corresponding components of the resonant converter 100. As shown in FIG. 4A, the primary side inverter 402 is coupled in parallel to two input capacitors Cin1 and Cin2 that are connected in series. The input capacitors may be used as an input filter to absorb pulsating current that would otherwise be drawn from the input DC source. The primary side inverter 402 is configured as a multi-level half-bridge inverter. One of ordinary skill in the art would recognize that any multi-level half-bridge inverters, such as a three-level, five-level, or seven-level inverter, may be used as the primary side inverter 402. The primary side inverter 402 includes four switching elements Q1, Q2, Q3 and Q4. A first pair of switching elements Q1 and Q2 are connected in series. A second pair of switching elements Q3 and Q4 are connected in series. The common node of the switching elements Q1 and Q2 is coupled to a first input terminal T1 of the resonant tank 404. Likewise, the common node of the switching elements Q3 and Q4 is coupled to a second input terminal T2 of the resonant tank 404. Switching elements Q2 and Q3 are coupled in series, and the common node of Q2 and Q3 is coupled to the common node of the input capacitors Cin1 and Cin2.

Similar to what is illustrated with respect to FIG. 2A, the resonant tank 404 is formed by a series resonant capacitor Cr1, a series resonant inductor Lr, a parallel inductance Lm at the primary side of the transformer 412, and a series resonant capacitor Cr2 at the secondary side of the transformer 412. As shown in FIG. 4A, the series resonant inductor Lr and the series resonant capacitor Cr1 are connected in series and further coupled to the primary side of the transformer 412. The series resonant capacitor Cr2 is connected in series to a first terminal of the secondary winding of the transformer 412. The series resonant capacitors Cr1 and Cr2 form the resonant capacitance of the resonant tank 404. The series resonant capacitor Cr1 also functions as a DC-blocking capacitor for the primary side circuit of the resonant converter 400. Similarly, the series resonant capacitor Cr2 also functions as a DC-blocking capacitor for the secondary side circuit of the resonant converter 400. The transformer 412 is formed by a primary winding with Np turns and a secondary winding with Ns turns. The primary winding is coupled to terminals T3 and T4 of the resonant tank 404 and the secondary winding is coupled to the output filter 416 through the series resonant capacitor Cr2 and the secondary side rectifier 414.

The secondary side rectifier 414 is coupled in parallel to two output capacitors Co1 and Co2 which are connected in series and form the output filter 416. The secondary side rectifier 414 is a multi-level half-bridge rectifier and includes four switches Q5, Q6, Q7 and Q8. Switches Q5 and Q6 are connected in series and switches Q7 and Q8 are connected in series. Switches Q6 and Q7 are connected in series. The common node T5 of the switches Q5 and Q6 is coupled to a terminal of the series resonant capacitor Cr2, and the common node T6 of the switches Q7 and Q8 is coupled to a second terminal of the secondary winding of the transformer 412. The common node of the switches Q6 and Q7 is coupled to the common node of the output capacitors Co1 and Co2.

Figure 4B:
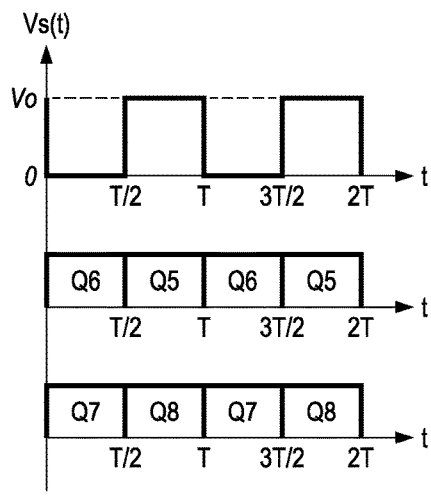
FIG. 4B illustrates a switching waveform of a voltage Vs of the resonant converter in FIG. 4A, and a timing diagram of the gate drive signals for the secondary side switches of the resonant converter when the secondary side rectifier of the resonant converter operates at a two-level half-bridge mode.
Figure 4C:
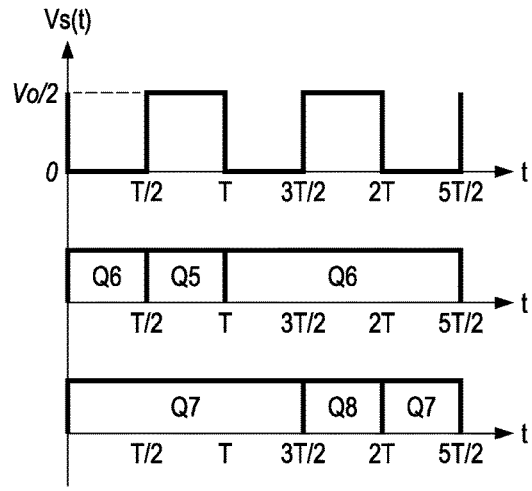
FIG. 4C illustrates a switching waveform of a voltage Vs of the resonant converter in FIG. 4A, and a timing diagram of the gate drive signals for the secondary side switches of the resonant converter when the secondary side rectifier of the resonant converter operates at a three-level half-bridge mode.

The secondary side rectifier 414 has a topology configured that it can operate at different operating modes, such as a two-level half-bridge mode or a three-level half-bridge mode. FIG. 4B and FIG. 4C illustrate switching waveforms of a voltage Vs across the nodes T5 and T6, and timing diagrams of the gate drive signals of switches Q5, Q6, Q7 and Q8 when the secondary side rectifier 414 is operating at the two-level half-bridge mode (FIG. 4B) and the three-level half-bridge mode (FIG. 4C), respectively. As shown in FIG. 4B, in the two-level half-bridge mode, switches Q5 and Q6 are turned on and off alternately, and Q7 and Q8 are turned on and off alternately at 50% duty cycle. Switches Q5 and Q8 work in phase, and switches Q6 and Q7 work in phase. Switches Q5 and Q6 switch out of phases to prevent shoot through. Likewise, switches Q7 and Q8 switch out of phases to prevent the shoot through. The resonant tank frequency is 1/T. FIG. 4B shows that the output voltage Vo equals the peak amplitude of Vs. As discussed above, the voltage conversion ratio of the secondary side rectifier 414 may be defined as a ratio of the output voltage Vo of the resonant converter 400 to a half of the peak-to-peak value of the voltage Vs across the nodes T5 and T6, and the secondary side rectifier 414 operating at the two-level half-bridge mode has a voltage conversion ratio of 2.

When operating at the three-level half-bridge mode, according to one embodiment shown in FIG. 4C, the switching sequence of the switches Q5, Q6, Q7 and Q8 is:
1) Q6 and Q7 are on, and Q5 and Q8 are off;
2) Q5 and Q7 are on, and Q6 and Q8 are off;
3) Q6 and Q7 are on, Q5 and Q8 are off; and
4) Q6 and Q8 are on, and Q5 and Q7 are off.

Q6 and Q7 switch at 75% duty cycle, and Q5 and Q8 switch at 25% duty cycle at switching frequency 1/(2T). The voltage conversion ratio of the secondary side rectifier 414 operating at the three-level half-bridge mode is 4. Switches Q6 and Q7 may operate as the mode controlling switches and control can be applied to switches Q6 and Q7 to switch the secondary side rectifier 414 between the two-level half-bridge mode and the three-level half-bridge mode. According to one embodiment, switches Q6 and Q7 may be implemented by any controllable switches, while Q5 and Q8, which are the non-mode controlling switches, may be rectifier diodes. Alternatively, all of the switches Q5, Q6, Q7 and Q8 may be controllable switches.

Figure 5:
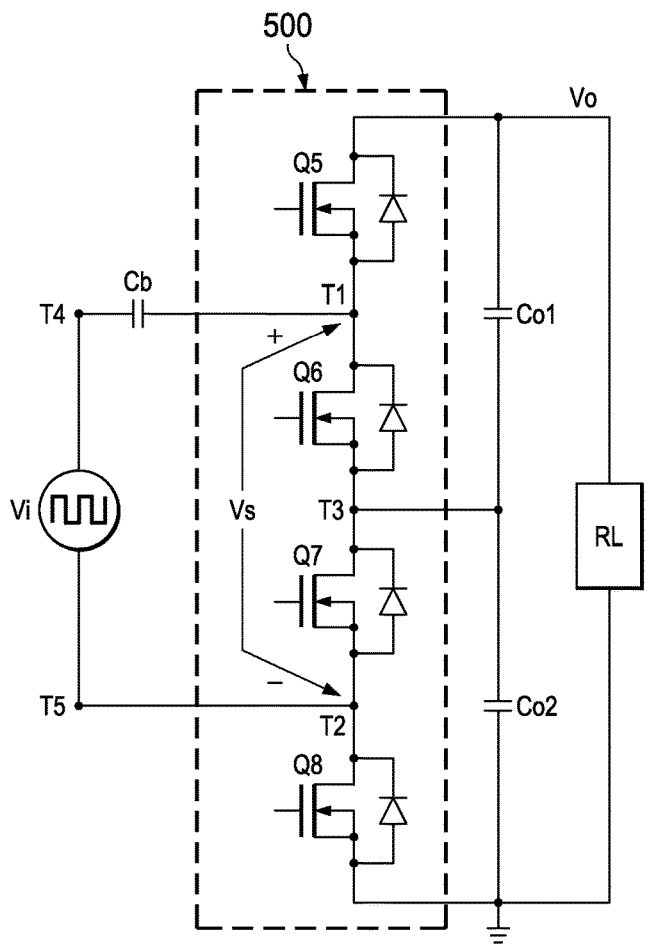
FIG. 5 illustrates a schematic diagram of yet another embodiment rectifier.

FIG. 5 illustrates a schematic diagram of another embodiment AC/DC rectifier 500 operable at multiple operating modes. As shown, the AC/DC rectifier 500 is coupled to an input AC power source Vi through a DC blocking capacitor Cb. The AC/DC rectifier 500 has a two-level and three-level half-bridge topology similar to the secondary side rectifier illustrated in FIG. 4A. The AC/DC rectifier 500 includes four switches Q5, Q6, Q7 and Q8. Switches Q5 and Q6 are connected in series and switches Q7 and Q8 are connected in series. Switches Q6 and Q7 are connected in series. The common node T1 of the switches Q5 and Q6 is coupled to a terminal of the DC blocking capacitor Cb which is further coupled to a first input node T4 of the input AC power source Vi, and the common node T2 of the switches Q7 and Q8 is coupled to a second input node T5 of the input AC power source Vi. The common node T3 of the switches Q6 and Q7 is coupled to the common node of output capacitors Co1 and Co2, which function as an output filter of the AC/DC rectifier 500. The output capacitors Co1 and Co2 are coupled in series and further coupled to a load RL in parallel. The AC/DC rectifiers in FIG. 3 and FIG. 5 may have other types of topologies and operating at multiple operating modes according to the respective topologies. For example, an AC/DC rectifier may have a multi-level bridge type topologies and operating at different levels of bridge modes. Control mechanism may be applied to the AC/DC rectifier for operating mode changes.

Similar to the discussion with respect to FIG. 4A, FIG. 4B and FIG. 4C, the AC/DC rectifier 500 may operate at multiple operating modes according to its topology, i.e., a two-level half-bridge mode and a three-level half-bridge mode. Switches Q6 and Q7 may operate as the mode controlling switches and control can be applied to switches Q6 and Q7 to switch the AC/DC rectifier 500 between the two-level half-bridge mode and the three-level half-bridge mode. Switches Q6 and Q7 may be implemented by any controllable switches, while Q5 and Q8, which are the non-mode controlling switches, may be rectifier diodes. Alternatively, all of the switches Q5, Q6, Q7 and Q8 may be controllable switches. The AC/DC rectifier 500 may also have a topology of other multi-level bridge type rectifiers and be configured to operate at multiple operating modes.

For a resonant converter, such as the resonant converters illustrated in FIG. 2A and FIG. 4A, working in a steady state, when its secondary side rectifier operates at different operating modes, the DC voltage on the series resonant capacitor Cr2 may be different. For example, the DC voltage on Cr2 is around 0V for the full-bridge mode and Vo/2 for the half-bridge mode, respectively. If the operating mode of the secondary side rectifier is changed instantly when the resonant converter is in steady state operation, this difference in the DC voltage of the series resonant capacitor Cr2 may cause transformer core saturation. The transformer core saturation, along with the instant change of the voltage conversion ratio resulted from the change of operating modes, may further cause significant output voltage overshoot or undershoot, and component overstresses in the converter circuit.

For power supply converter topology transition or morphing control, a general approach to control the issues described above is to gradually vary the gate drive duty cycles of the mode controlling switch(es) over a large number of switching cycles for transitioning from one operating mode to a different operating mode. This can help spread out the circuit transients over a significantly large time span to suppress the magnitudes of the transient responses. For example, in the process of the secondary side rectifier 214 in FIG. 2A transitioning from the full-bridge mode into the half-bridge mode, the duty cycle of Q8 as the mode controlling switch, may be gradually increased from 0.5 to 1 over a series of switching cycles, and in the meantime the gate drive of Q7 maintains complementary to Q8's gate drive with proper dead times. When the secondary side rectifier 214 transitions from the half-bridge mode to the full-bridge mode, Q8 and Q7 may be controlled in a reversed sequence. This control process may be applied to the transition or morphing of both the primary side inverter and secondary side rectifier.

Figure 6:
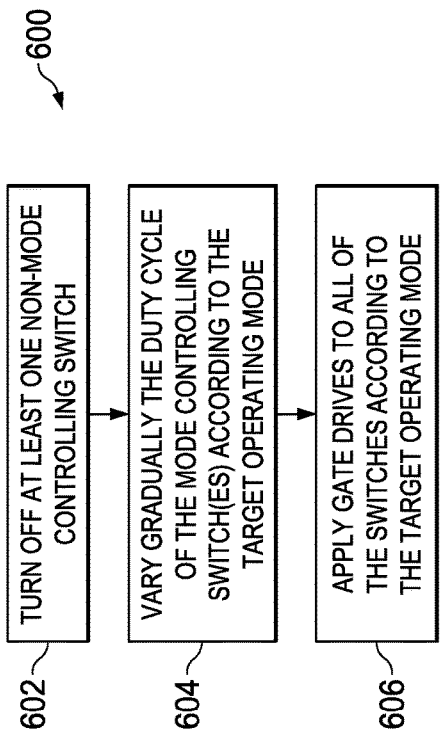
FIG. 6 illustrates a flow chart of an embodiment method for switching a rectifier from one operating mode to a different operating mode.

FIG. 6 illustrates a flow chart of another embodiment method 600 for transitioning the secondary side rectifier of a resonant converter from one operating mode to a different operating mode. During the switching process of the secondary side rectifier from one operating mode to a different operating mode, at least one of the non-mode controlling switches are turned off and remains off at step 602. The duty cycles of the mode controlling switch(es) are then varied gradually over a series of switching cycles according to the target operating mode to meet the duty cycle requirement of the target operating mode at step 604. For example, the duty cycle may be incremented gradually from 0.5 to 1 when the secondary side rectifier 214 is switching from the full-bridge mode to the half-bridge mode, or may be decremented gradually from 1 to 0.5 when the switching is from the half-bridge mode to the full-bridge mode. After the mode controlling switch(es) have reached the required duty cycles of the target operating mode, gate drives are applied to all of the switches at step 606 so that all switches may operate according to the target operating mode. For example, referring back to FIG. 2A, FIG. 2B and FIG. 2C, when the secondary side rectifier 214 is switching from a full-bridge mode to a half-bridge mode, switches Q5, Q6 and Q7 are switched off, and the duty cycle of switch Q8, which is the mode controlling switch, is gradually increased from 0.5 to 1. Then gate drives are applied to switches Q5, Q6, Q7 and Q8 so that switches Q5 and Q6 switch on and off alternately, switch Q7 remains off and switch Q8 remains on according to the half-bridge mode, which is the target operating mode. This may be especially useful when the gate drives of the secondary side switches are not smart gate drive type that can prevent backward current flowing from drain to source during the mode transition. When the secondary side rectifier 214 is switching from a half-bridge mode to a full-bridge mode, switches Q5, Q6 and Q7 are switched off, and the duty cycle of switch Q8 is gradually decreased from 1 to 0.5. Then, gate drives are applied to switches Q5, Q6, Q7 and Q8 so that they switch on and off in accordance with the full-bridge mode. This may minimize the reverse power flowing from the output to the input side and thus reduce the circuit transients and component stresses associated with the mode switching process. The method 600 may be applied to switch operating modes of a secondary side rectifier of any other type of bridge converter with a transformer where the secondary side rectifier operates at multiple operating modes. The method 600 may also be applied to switch operating modes of any AC/DC rectifier that is operable at multiple operating modes, such as the AC/DC rectifiers illustrated in FIG. 3 and FIG. 5.

As described above, the secondary side rectifier capable of operating at different operating modes is beneficial, for a resonant converter including such a secondary side rectifier is capable of achieving high efficiency with wide input and output voltage ranges. Moreover, the primary side inverter of the resonant converter may also be configured to operate at different operating modes similar to the secondary side rectifier for achieving a desired voltage conversion ratio. For example, the primary side inverter, according to the topologies of the primary side switches, may operate at a half-bridge mode and a full-bridge mode, or at a two-level half-bridge mode and a three-level half-bridge mode. Thus, both the primary side and the secondary side of the resonant converter may operate at different operating modes, and various combinations of operating modes for the primary side and the secondary side may be used to achieve a better conversion efficiency and power density for the resonant converter. Table 1 shows an example of various combinations of operating modes for the primary side and the secondary side of a resonant converter with corresponding operating parameters including primary voltage conversion ratio VCR1, i.e., (input voltage of the transformer)/Vin, where Vin is an input voltage of the resonant converter as shown in FIG. 2A and FIG. 4A, secondary voltage conversion ratio VCR2, i.e., Vo/(output voltage of the transformer) or Vo/(half of the peak-to-peak voltage Vs), where Vo is the output voltage of the resonant converter, primary switch voltage stress on each of the primary side switches, secondary switch voltage stress on each of the secondary side switches, DC bias voltages on the series resonant capacitors Cr1 and Cr2, and combined voltage conversion ratio VCRtot which equals VCR1*VCR2. For example, the first row of Table 1 shows that a primary side inverter operates at a full-bridge mode and a secondary side rectifier at a full-bridge mode, resulting in a combined voltage conversion ratio of 1. While the last row of Table 1 shows a primary side inverter operates at a half-bridge voltage doubler mode and a secondary side rectifier at a two-level half-bridge mode, resulting in a combined voltage conversion ratio of 1. Throughout this disclosure, the terms "primary side" and "primary side inverter" are used interchangeably, and the terms "secondary side" and "secondary side rectifier" are used interchangeably.

TABLE 1

| Primary Side | Primary Voltage Conversion Ratio VCR1 | Primary Switch Voltage Stress | Vdc(Cr1) | Secondary Side | Secondary Voltage Conversion Ratio VCR2 | Secondary Switch Voltage Stress | Vdc(Cr2) | Combined Voltage Conversion Ratio VCRtot = VCR1*VCR2 |
|---|---|---|---|---|---|---|---|---|
| Full-bridge | 1 | Vin | 0 | Full-bridge | 1 | Vo | 0 | 1 |
| Full-bridge | 1 | Vin | 0 | Half-bridge Voltage Doubler | 2 | Vo | Vo/2 | 2 |

TABLE 1-continued

| Primary Side | Primary Voltage Conversion Ratio VCR1 | Primary Switch Voltage Stress | Vdc(Cr1) | Secondary Side | Secondary Voltage Conversion Ratio VCR2 | Secondary Switch Voltage Stress | Vdc(Cr2) | Combined Voltage Conversion Ratio VCRtot = VCR1*VCR2 |
|---|---|---|---|---|---|---|---|---|
| Half-bridge | 1/2 | Vin | Vin/2 | Full-bridge | 1 | Vo | 0 | 1/2 |
| Two-level half-bridge | 1/2 | Vin/2 | Vin/2 | Two-level half-bridge | 2 | Vo/2 | Vo/2 | 1 |
| Two-level half-bridge | 1/2 | Vin/2 | Vin/2 | Three-level half-bridge | 4 | Vo/2 | Vo/4 | 2 |
| Three-level half-bridge | 1/4 | Vin/2 | Vin/4 | Two-level half-bridge | 2 | Vo/2 | Vo/2 | 1/2 |
| Two-level half-bridge | 1/2 | Vin/2 | Vin/2 | Full-bridge | 1 | Vo | 0 | 1/2 |
| Two-level half-bridge | 1/2 | Vin/2 | Vin/2 | Half-bridge Voltage Doubler | 2 | Vo | Vo/2 | 1 |
| Three-level half-bridge | 1/4 | Vin/2 | Vin/4 | Full-bridge | 1 | Vo | 0 | 1/4 |
| Full-bridge | 1 | Vin | 0 | Two-level half-bridge | 2 | Vo/2 | Vo/2 | 2 |
| Full-bridge | 1 | Vin | 0 | Three-level half-bridge | 4 | Vo/2 | Vo/4 | 4 |
| Half-bridge | 1/2 | Vin | Vin/2 | Two-level half-bridge | 2 | Vo/2 | Vo/2 | 1 |

Figure 7:
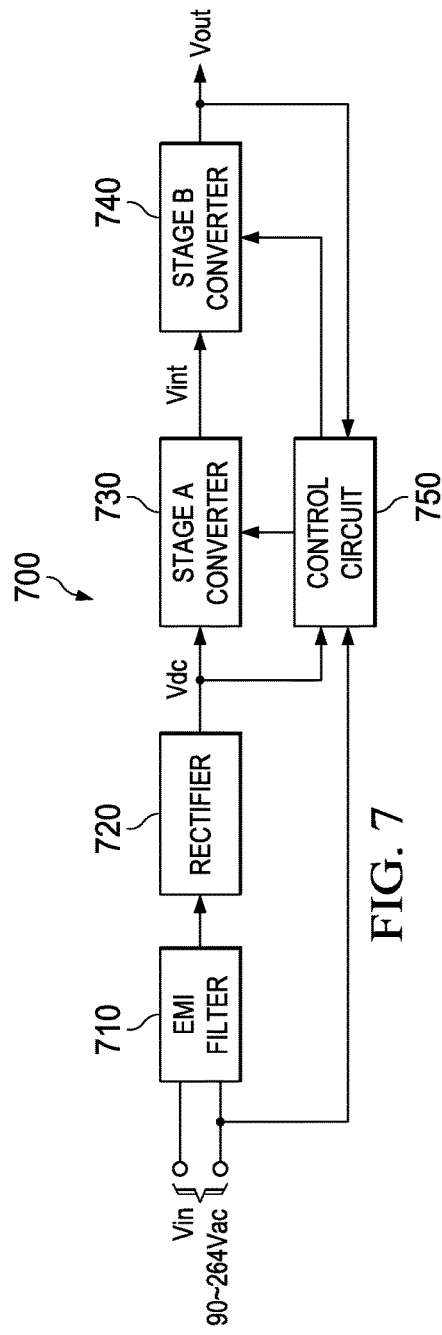
FIG. 7 illustrates a block diagram of an embodiment AC/DC converter.

FIG. 7 illustrates a block diagram of an embodiment AC/DC converter 700. The AC/DC converter 700 includes an electromagnetic interference filter (EMI) filter 710 coupled to an input AC power source with an AC voltage in a universal range from 90V to 264V. The EMI filter 710 is used to suppress conducted EMI from penetrating into the input AC mains. The EMI filter 710 is coupled to a rectifier 720 which converts the AC input voltage into a DC voltage. One of ordinary skill in the art would recognize that there may be many variations, alternatives and modifications for implementing the EMI filter 710 and the rectifier 720. The detailed operations and structures of the EMI filter 710 and the rectifier 720 are well known in the art, and hence are not discussed herein.

The AC/DC converter 700 further includes a Stage A converter 730 coupled between the rectifier 720 and a Stage B converter 740. In accordance with one embodiment, the Stage A converter 730 is used to narrow the conversion voltage range and provide a high efficiency voltage conversion for Stage B converter 740. For example, the Stage A converter 730 may be a resonant converter illustrated in FIG. 1, FIG. 2A or FIG. 4A, such as an LLC, LCC or LLCC resonant converter, that operates at a fixed switching frequency, such as at or near a resonant tank frequency to achieve high efficiency, and also provides electrical isolation between its primary side and secondary side circuits. The Stage A converter 730 may have a topology that both of its primary side and secondary side operate at different operating modes. For example, the Stage A converter 730 may be a resonant converter as shown in FIG. 2A, where both the primary side inverter and the secondary side rectifier can operate at a full-bridge mode and a half-bridge mode. Alternatively, the Stage A converter 730 may be a resonant converter as shown in FIG. 4A, where both the primary side and the secondary side can operate at a two-level half-bridge mode and a three-level half-bridge mode. In another embodiment, the Stage A converter 730's primary side may be a full bridge inverter operating at a full-bridge mode and a half bridge inverter operating at a half-bridge mode, and its secondary side may be a two-level half-bridge rectifier operating at a two-level half-bridge mode and a three-level half-bridge rectifier operating at a three-level half-bridge mode. In yet another embodiment, the Stage A converter 730's primary side may be a two-level half-bridge inverter and a three-level half-bridge inverter, and its secondary side may be a full-bridge rectifier and a half-bridge rectifier. As discussed above, various combinations of the topologies and operating modes for the primary side and the secondary side of the resonant converter may be used for the Stage A converter 730.

Further, the primary side or the secondary side of the Stage A converter 730 may use the primary or secondary side topologies of any other multi-level bridge type of converters or cascaded converters that can be configured in multi-mode operations to provide multi-range of voltage conversion ratio. Examples include 3-level, 4-level, 5-level NPC converters or non-NPC converters. Moreover, the Stage A converter 730 may be implemented by any DC/DC converter with a transformer including a primary side and a secondary side that are operable at multiple operating modes. The DC/DC converter may have a topology of any bridge type converter. By adjusting the operating modes of the primary side and/or the secondary side, the DC/DC converter may achieve a 50% or a near 50% duty cycle, producing a high efficiency voltage conversion. Such a DC/DC converter may be used to produce multiple ranges of voltage conversion ratio and high conversion efficiency. In the following description with respect to the AC/DC converter 700, a resonant converter as illustrated in FIG. 1 will be used as an example of the Stage A converter 730 for purpose of illustration, and should not be interpreted to be limiting to the scope of the claims.

The Stage B converter 740 may be a non-isolated DC/DC converter that provides voltage regulation to the output voltage Vint of the Stage A converter 730 to meet the output voltage requirement of the AC/DC converter 700. The non-isolated DC/DC converter herein refers to any DC/DC converter that does not have an isolation transformer in the power train. The Stage B converter 740 may be implemented as any non-isolated DC/DC converter, such as a Buck, Boost, or Buck-Boost converter. Alternatively, the Stage B converter 740 may also be a non-isolated DC/DC converter with multi-level configurations, such as a three-level, four-level, or five-level Buck, Boost, or Buck-Boost converter, that can be configured to operate at multiple operating modes, thus obtaining multiple ranges of voltage conversion ratio.

The AC/DC converter 700 further includes a control circuit 750 coupled to the Stage A resonant converter 730. The control circuit 750 may be configured to determine the operating mode that the primary side or the secondary side of the Stage A converter 730 will use. The control circuit 750 may also be configured to control the primary side and the secondary side of the Stage A converter 730 to operate at different operating modes. The control circuit 750 may further be configured to determine the operating mode for the Stage B converter 740 when the Stage B converter 740 is capable of operating at multiple modes, and control the Stage B converter 740 to operate at a determined operating mode. The control circuit 750 may be implemented by a pulse-width modulation (PWM) controller, a microcontroller, or any other controllers. One of ordinary skill in the art would recognize many variations, alternatives, and modifications for implementing the control circuit 750.

The control circuit 750 may make the determination of operating modes for the primary and secondary side of the Stage A converter 730 according to information such as the input AC voltage and output DC voltage of the AC/DC converter 700, the output voltage Vdc of the rectifier 720, the conversion ratio of the Stage A resonant converter 730, the topology of the primary side and the secondary side of the Stage A resonant converter 730, the conversion ratio of the Stage B DC/DC converter 740, the conversion ratio of the transformer of the Stage A converter, and a duty cycle of the Stage B DC/DC converter 740. For example, when the input AC voltage of the AC/DC converter 700 is at a low line below a pre-defined threshold voltage, e.g., 170V, the Stage A converter's primary side may be controlled to operate at a full-bridge mode if the primary side has a bridge type topology. When the input AC voltage is above the pre-defined threshold voltage, the primary side may be switched to operate at a half-bridge mode. When a required output DC voltage of the AC/DC converter 700 is at a high voltage level such as 12V, the secondary side may be controlled to operate at a half-bridge mode if the secondary side has a bridge type topology, and when the required DC output voltage is at a low voltage level such as 5V, the secondary side may be switched to operate at a full-bridge mode. Alternatively, the primary side and the secondary side may have a multi-level half-bridge topology and may switch between multi-level modes according to the input AC voltage and the required output DC voltage.

The control circuit 750 may receive information from other devices for determining an operating mode for the primary side or the secondary side. For example, the information of the AC/DC converter 700's output voltage level demanded by a load device may be transmitted to the control circuit 750 using means such as an isolated data interface integrate circuit (IC). The control circuit 750 may also detect the voltage information of the input or output voltage of the AC/DC converter 700 using means such as a voltage sensor. Some of the information, such as the topology of the primary side and the secondary side of the Stage A resonant converter 730 may be pre-stored so that the control circuit 750 may retrieve such information for making determination on the operating modes.

When the control circuit 750 determines that the primary side or the secondary side of the Stage A converter 730 needs to switch from one operating mode to a different operating mode, it may generate drive signals for the gates of the switches of the primary side or the secondary side, and control the switching or transitioning process until the switching or transitioning is done. In one embodiment, the method 600 described with respect to FIG. 6 may be used to perform the operating mode switching. One of ordinary skill in the art would recognize many variations, alternatives, and modifications for controlling operating mode switching of the Stage A converter 730.

The control circuit 750 may also be used to control the Stage B non-isolated DC/DC to operate at different operating modes when the non-isolated DC/DC converter has a topology that can be configured to operate at different modes, so that the non-isolated DC/DC converter may have multiple ranges of voltage conversion ratio. For example, when the non-isolated DC/DC converter 740 has a topology of a multi-level Buck converter, the control circuit 750 may control the non-isolated DC/DC converter 740 to switch between multi-level Buck modes, e.g., according to information about the input voltage and the required output voltage of the AC/DC converter 700.

By selecting proper circuit topology and operating mode for both of the primary side and secondary side of the Stage A converter 730, both the Stage A and Stage B converters may be fully utilized to achieve improved system efficiency. For example, when the output DC voltage Vout is set to a low voltage level (e.g. 5V) and the input AC voltage is also at a low line (e.g. 115 Vac), both primary side and secondary side may operate at the full-bridge mode if they have a full-bridge and half-bridge topology. Similarly, when the output DC voltage is set to a high voltage level (e.g. 12V) and the input AC voltage is at a low line (e.g. 115 Vac), the primary side may use the full-bridge mode and the secondary side may use the half-bridge mode. This may narrow the duty cycle range of the non-isolated DC/DC converter 740 and thus achieve higher efficiency of the AC/DC converter 700. In accordance with some embodiments, a criteria for determining appropriate operating modes for the primary side and secondary side of the Stage A converter 730 adaptively is to minimize the duty cycle range of the Stage B converter 740 and place the minimized duty cycle range at a preselected optimal spot inside [0, 1].

Table 2 shows operation parameters of the AC/DC converter 700 where the Stage A converter 730 is implemented by a resonant converter as illustrated in FIG. 2A, according to some embodiments of the present disclosure. The primary side and the secondary side of the resonant converter have a full-bridge and half-bridge topology, and each may operate at the half-bridge and full-bridge operating modes. The Stage B converter 740 is a DC/DC Buck converter. Table 2 also shows the duty cycles of the Stage B Buck converter corresponding to various combinations of operating modes on the primary side and secondary side.

TABLE 2

| Vin(ac) (V) | Input Rectifier Output (V) | Vo (V) | Primary Side | Primary Voltage Conversion Ratio VCR1 | Np/Ns | Secondary Side | Secondary Voltage Conversion Ratio VCR2 | Resonant Converter Output Voltage | DC/DC Buck Converter Duty Cycle |
|---|---|---|---|---|---|---|---|---|---|
| 115 | 160 | 5 | Full-bridge | 1 | 16 | Full-bridge | 1 | 10 | 0.5 |
| 85 | 118 | 5 | Full-bridge | 1 | 16 | Full-bridge | 1 | 7.4 | 0.68 |
| 230 | 320 | 5 | Half-bridge | 0.5 | 16 | Full-bridge | 1 | 10 | 0.5 |
| 265 | 369 | 5 | Half-bridge | 0.5 | 16 | Full-bridge | 1 | 11.5 | 0.43 |
| 115 | 160 | 12 | Full-bridge | 1 | 16 | Half-bridge V-Doubler | 2 | 20 | 0.6 |
| 85 | 118 | 12 | Full-bridge | 1 | 16 | Half-bridge V-Doubler | 2 | 14.75 | 0.81 |

TABLE 2-continued

| Vin(ac) (V) | Input Rectifier Output (V) | Vo (V) | Primary Side | Primary Voltage Conversion Ratio VCR1 | Np/Ns | Secondary Side | Secondary Voltage Conversion Ratio VCR2 | Resonant Converter Output Voltage | DC/DC Buck Converter Duty Cycle |
|---|---|---|---|---|---|---|---|---|---|
| 230 | 320 | 12 | Full-bridge | 1 | 16 | Full-bridge | 1 | 20 | 0.6 |
| 265 | 369 | 12 | Full-bridge | 1 | 16 | Full-bridge | 1 | 23 | 0.52 |

Table 3 shows operation parameters of the AC/DC converter 700 according to some embodiments of the present disclosure, where the Stage A converter 730 is implemented by a resonant converter, with the primary side operating at the two-level and three-level half-bridge modes with a topology as illustrated in FIG. 4A, and the secondary side operating at the half-bridge and full-bridge modes with a topology as illustrated in FIG. 2A. The Stage B converter 740 is a DC/DC Buck converter.

TABLE 3

| Vin(ac) (V) | Input Rectifier Output (V) | Vo (V) | Primacy Side | Primary Voltage Conversion Ratio VCR1 | Np/Ns | Secondary Side | Secondary Voltage Conversion Ratio VCR2 | Resonant Converter Output Voltage | DC/DC Buck Converter Duty Cycle |
|---|---|---|---|---|---|---|---|---|---|
| 115 | 160 | 5 | Two-level half-bridge | 0.5 | 8 | Full-bridge | 1 | 10 | 0.5 |
| 85 | 118 | 5 | Two-level half-bridge | 0.5 | 8 | Full-bridge | 1 | 7.4 | 0.68 |
| 230 | 320 | 5 | Three-level half-bridge | 0.25 | 8 | Full-bridge | 1 | 10 | 0.5 |
| 265 | 369 | 5 | Three-level half-bridge | 0.25 | 8 | Full-bridge | 1 | 11.5 | 0.43 |
| 115 | 160 | 12 | Two-level half-bridge | 0.5 | 8 | Half-bridge V-Doubler | 2 | 20 | 0.6 |
| 85 | 118 | 12 | Two-level half-bridge | 0.5 | 8 | Half-bridge V-Doubler | 2 | 14.75 | 0.81 |
| 230 | 320 | 12 | Two-level half-bridge | 0.5 | 8 | Full-bridge | 1 | 20 | 0.6 |
| 265 | 369 | 12 | Two-level half-bridge | 0.5 | 8 | Full-bridge | 1 | 23 | 0.52 |

Table 4 shows operation parameters of the AC/DC converter 700 according to some embodiments of the present disclosure, where the Stage A converter 730 is implemented by a resonant converter as illustrated in FIG. 4A, with the primary side and the secondary side operating at the two-level and three-level half-bridge modes. The Stage B converter 740 is a DC/DC Buck converter.

TABLE 4

| Vin(ac) (V) | Input Rectifier Output (V) | Vo (V) | Primacy Side | Primary Voltage Conversion Ratio VCR1 | Np/Ns | Secondary Side | Secondary Voltage Conversion Ratio VCR2 | Resonant Converter Output Voltage | DC/DC Buck Converter Duty Cycle |
|---|---|---|---|---|---|---|---|---|---|
| 115 | 160 | 5 | Three-level half-bridge | 0.25 | 16 | Three-level half-bridge | 4 | 10 | 0.5 |
| 85 | 118 | 5 | Three-level half-bridge | 0.25 | 16 | Three-level half-bridge | 4 | 7.4 | 0.68 |
| 230 | 320 | 5 | Three-level half-bridge | 0.25 | 16 | Two-level half-bridge | 2 | 10 | 0.5 |
| 265 | 369 | 5 | Three-level half-bridge | 0.25 | 16 | Two-level half-bridge | 2 | 11.5 | 0.43 |
| 115 | 160 | 12 | Two-level half-bridge | 0.5 | 16 | Three-level half-bridge | 4 | 20 | 0.6 |
| 85 | 118 | 12 | Two-level half-bridge | 0.5 | 16 | Three-level half-bridge | 4 | 14.75 | 0.81 |
| 230 | 320 | 12 | Three-level half-bridge | 0.25 | 16 | Three-level half-bridge | 4 | 20 | 0.6 |
| 265 | 369 | 12 | Three-level half-bridge | 0.25 | 16 | Three-level half-bridge | 4 | 23 | 0.52 |

Table 5 shows the operation parameters of the AC/DC converter 700 according to some embodiments of the present disclosure, where the Stage A converter 730 is implemented by a resonant converter as illustrated in FIG. 2A, and both the primary side and the secondary side only operate at the full-bridge mode. The Stage B converter 740 is a DC/DC Buck converter. In comparison with Table 2, when both the primary side and the secondary side operate at a single operating mode, the minimum duty cycle of the DC/DC Buck converter is lowered by four times from 0.43 down to 0.108. At a small duty cycle down to this level, the efficiency of the Buck converter may suffer significantly.

TABLE 5

| Vin(ac) (V) | Input Rectifier Output (V) | Vo (V) | Primary Side | Primary Voltage Conversion Ratio VCR1 | Np/Ns | Secondary Side | Secondary Voltage Conversion Ratio VCR2 | Resonant Converter Output Voltage | DC/DC Buck Converter Duty Cycle |
|---|---|---|---|---|---|---|---|---|---|
| 115 | 160 | 5 | Full-bridge | 1 | 8 | Full-bridge | 1 | 20 | 0.25 |
| 85 | 118 | 5 | Full-bridge | 1 | 8 | Full-bridge | 1 | 14.75 | 0.34 |
| 230 | 320 | 5 | Full-bridge | 1 | 8 | Full-bridge | 1 | 40 | 0.125 |
| 265 | 369 | 5 | Full-bridge | 1 | 8 | Full-bridge | 1 | 46.125 | 0.108 |
| 115 | 160 | 12 | Full-bridge | 1 | 8 | Full-bridge | 1 | 20 | 0.6 |
| 85 | 118 | 12 | Full-bridge | 1 | 8 | Full-bridge | 1 | 14.75 | 0.814 |
| 230 | 320 | 12 | Full-bridge | 1 | 8 | Full-bridge | 1 | 40 | 0.3 |
| 265 | 369 | 12 | Full-bridge | 1 | 8 | Full-bridge | 1 | 46.125 | 0.26 |

Figure 8:
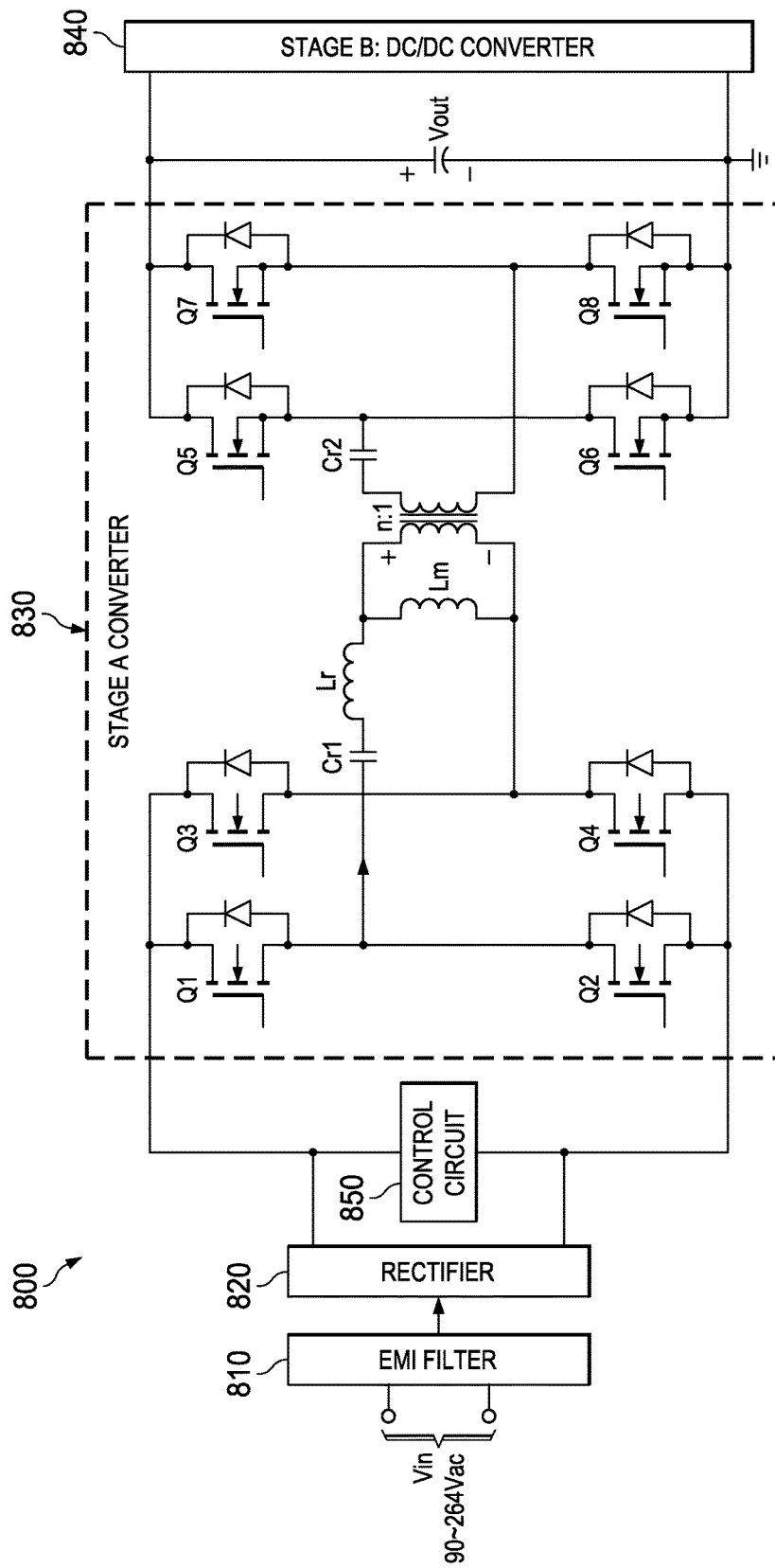
FIG. 8 illustrates a schematic diagram of an embodiment AC/DC converter.

FIG. 8 illustrates a schematic diagram of an embodiment AC/DC converter 800. As shown, the embodiment AC/DC converter 800 includes an EMI filter 810, a rectifier 820, a Stage A converter 830, a Stage B converter 840, and a control circuit 850. Components of the AC/DC converter 800 may be configured similarly to the corresponding components of the AC/DC converter 700. In an embodiment, the Stage A converter 830 is implemented using the resonant converter 200 illustrated in FIG. 2A. As shown, the control circuit 850 is coupled between the two output terminals of the rectifier 820. The control circuit 850 is also coupled (not shown) to the gates of the primary side switches and the secondary side switches of the Stage A converter 830 for controlling the primary side and secondary side to operate at different operating modes. The primary side of the Stage A converter 830 has a topology of full-bridge and half-bridge inverter, and the secondary side of the Stage A converter 830 has a topology of a full-bridge and half-bridge rectifier. As described above, the primary side and secondary side of a resonant converter may operate at various combinations of different operating modes to achieve an improved efficiency. For example, the primary side or the secondary side may operate at full-bridge and half-bridge modes and be controlled to switch between the two modes according to the input and output voltages. One of ordinary skill in the art would recognize that the Stage A converter 730 may also be implemented by the resonant converter 400 illustrated in FIG. 4A, and the primary and the secondary side may be controlled to operate at the two-level half-bridge and three-level half-bridge modes.

Figure 9:
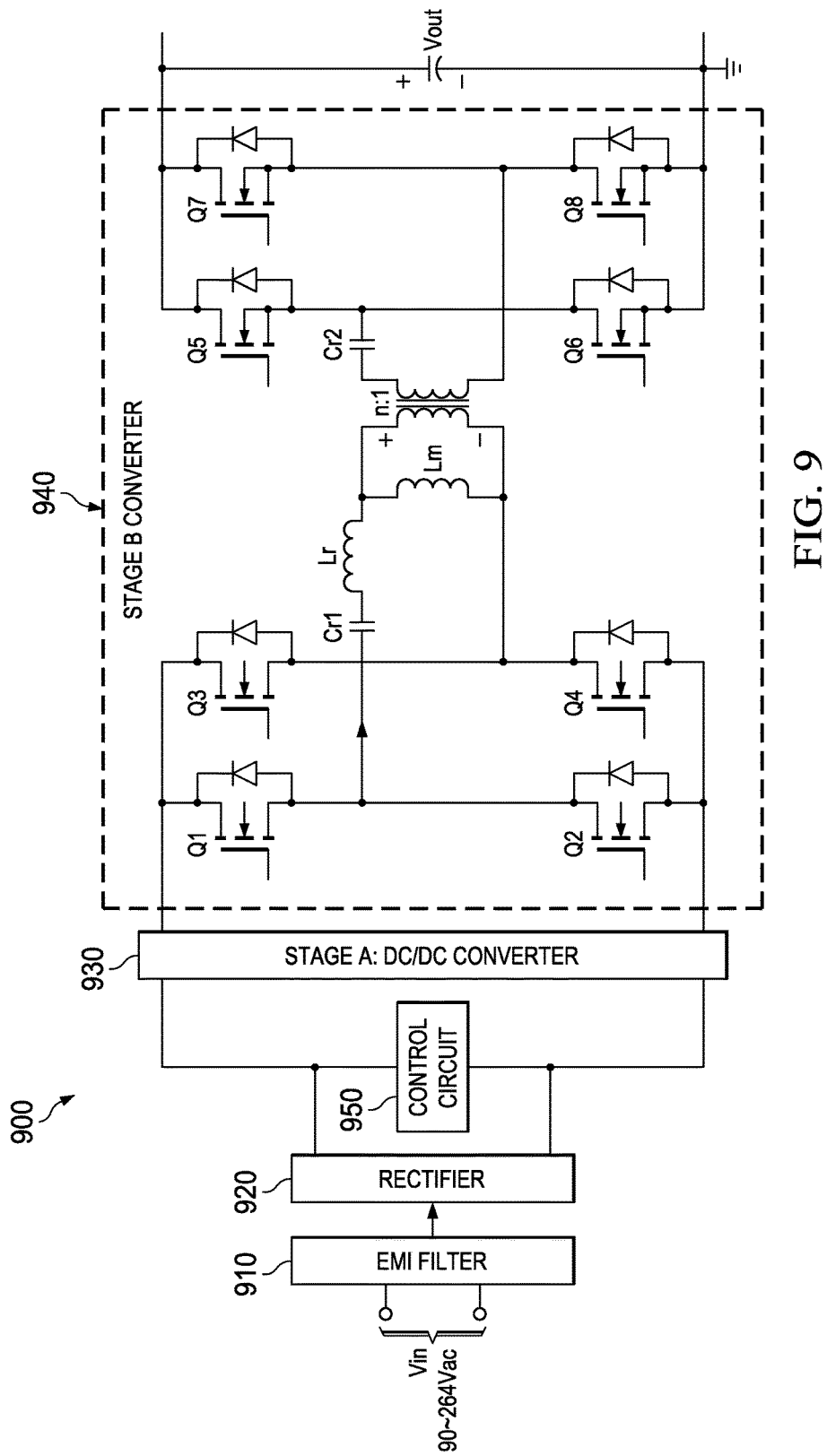
FIG. 9 illustrates a schematic diagram of another embodiment AC/DC converter.

In accordance with some alternative embodiments, the Stage A converter 730 of the AC/DC converter 700 may be a non-isolated DC/DC converter, and the Stage B converter may be a bridge type DC/DC converter that include a transformer and operates at multiple modes. In such case, a rectified DC voltage output from the rectifier 720 is first regulated by the non-isolated DC/DC converter, and then fed into the Stage B bridge type DC/DC converter for further voltage conversion. The non-isolated DC/DC converter and the bridge type DC/DC converter are similar to what is described with respect to FIG. 7. For example, the non-isolated DC/DC converter as the Stage A converter may be a Buck converter, or a multi-level Buck converter, and the bridge type DC/DC converter as the Stage B converter may be a resonant converter as illustrated in FIG. 1. The bridge type DC/DC converter operates at multiple operating modes, and the non-isolated DC/DC converter may also operate at multiple operating modes, under the control of the control circuit 750. FIG. 9 illustrates a schematic diagram of an embodiment AC/DC converter 900. As shown, the embodiment AC/DC converter 900 includes an EMI filter 910, a rectifier 920, a Stage A converter 930, a Stage B converter 940, and a control circuit 950. In one embodiment, the Stage A converter 930 is a non-isolated DC/DC converter, and the Stage B converter is implemented using the resonant converter 200 illustrated in FIG. 2A.

When the input and output voltages of an AC/DC adapter, e.g., the AC/DC converter 700, do not change significantly or remain constant, such as a universal AC/DC wall adaptor for a laptop where the input voltage may be either 115 Vac or 230 Vac and the output voltage is a single fixed voltage, the AC/DC adapter may only need to determine the operating modes for the primary side and secondary side of its DC/DC converter once when it is powering up the laptop. The AC/DC adapter does not need to change the operating modes of its primary side and secondary side thereafter.

When an AC/DC adapter operates with a wide input and output voltage range, for example, for QC 2.0 or USB power delivery (PD) protocol which may need an output voltage adjustable among 5V, 9V, 12V, 15V and 20V depending on types of the load, such as phones, tablets or laptops, the AC/DC adapter needs to determine corresponding operating modes for its primary side and the secondary side to achieve high conversion efficiency. As described above, referring back to FIG. 7, in accordance with some embodiments, the control circuit 750 of the AC/DC converter 700 may determine the operating modes for the primary side and the secondary side according to obtained information, and control the primary side and secondary side to switch to target operating modes. FIG. 10 illustrates a flow chart of an embodiment method 1000 for determining operating modes for the primary side and secondary side of the resonant converter of the AC/DC converter 700 according to an input voltage and an output voltage of the AC/DC converter 700.

The method 1000 starts with step 1002 where the control circuit 750 obtains information about the input and output voltages of the AC/DC converter 700. With the information about the input and output voltages, the control circuit 750 determines the required conversion ratio of the resonant converter of the AC/DC converter 700 at step 1004. The control circuit 750 then determines at step 1006 the operating modes for the primary side and the secondary side of the resonant converter according to the input and output voltages, the conversion ratio, and the topology of the primary side and the secondary side.

In accordance with some embodiments, look-up tables may be built up and used to determine the operating modes for the primary side and the secondary side corresponding to the input and output voltages and the conversion ratio. In some embodiments, the input AC voltage range of the AC/DC converter 700 may be divided into multiple input voltage sub-ranges. For example, the input voltage range is divided into two input voltage sub-ranges, where input voltages less than or equal to an input voltage threshold Vthi falls into a first input sub-range, and input voltages greater than the input voltage threshold Vthi falls into a second input sub-range. Similarly, the output voltage range may also be divided into multiple output voltage sub-ranges. For example, the output voltage range is divided into two sub-ranges, where output voltages less than or equal to an output voltage threshold Vtho falls into a first output voltage sub-range, and output voltages greater than the output voltage threshold Vtho falls into a second output sub-range. Thus the input-output voltage ranges are divided into two by two (2*2) regions—regions 11, 12, 21 and 22, as shown in FIG. 11A. The input voltage threshold and the output voltage threshold Vthi and Vtho may be pre-determined. When the input voltage ranges and the output voltage ranges are divided into more than two sub-ranges, respectively, multiple input voltage thresholds and output voltage thresholds pre-determined are provided. The number of the input voltage sub-ranges may be the same as or different from the number of the output voltage sub-ranges. For example, the input-output voltage ranges may be divided into a number of regions, such as 3*3, 4*4, 2*3, 4*3, n*n, or n*m regions, where n and m are integers greater than 1.

Corresponding to each of the regions 11, 12, 21 and 22, i.e., corresponding to each pair of the input voltage and output voltage, a voltage conversion ratio VCRtot of the resonant converter may be determined, which may take into account of information such as the conversion ratio of the non-isolated DC/DC converter. Thus, for the 2*2 regions, a 2*2 voltage conversion ratio table may be built up with each entry including a voltage conversion ratio corresponding to one of the 2*2 regions. For different voltage conversion ratios, there may be multiple such 2*2 tables built up, with each table including entries indicating different voltage conversion ratios corresponding to the 2*2 regions. The voltage conversion ratio VCRtot herein is referred to as the combined total voltage conversion ratio of the resonant converter, i.e., VCRtot=VCR1*VCR2, where VCR1 is the voltage conversion ratio of the primary side inverter of the resonant converter, and VCR2 is the voltage conversion ratio of the secondary side rectifier of the resonant converter. FIG. 11B shows an embodiment 2*2 voltage conversion ratio table corresponding to the 2*2 regions.

Since the primary side and the secondary side may use different topologies, there may be different combinations for their operating modes. Thus, each entry of a conversion ratio table may correspond to multiple combinations of operating modes for the primary side and secondary side. For example, the entry 11 of the tables in FIG. 11B-11E may correspond to combinations of operating modes including, e.g., 1) both the primary side and the secondary side of the resonant converter operate at a half-bridge or a full-bridge mode; 2) both the primary side and the secondary side of the resonant converter operate at multi-level half-bridge modes; 3) the primary side operates at a half-bridge or a full-bridge mode and the secondary side operates at multi-level half-bridge modes; and 4) the primary side operate at multi-level half-bridge modes and the secondary side operates at a half-bridge or a full-bridge mode. To simplify the tables, one embodiment is to expand the conversion ratio table with the combinations of operating modes. For example, each entry of a voltage conversion ratio table may include a voltage conversion ratio value, a corresponding operating mode for the primary side and a corresponding operating mode for the secondary side. FIG. 11B illustrates an embodiment expanded 2*2 voltage conversion ratio table, with each entry includes a voltage conversion ratio with corresponding combination of operating modes for the primary side and the secondary side, where the primary side and the secondary side of the resonant converter have a full-bridge and half-bridge topology. In FIG. 11B, for the voltage conversion ratio VCRtot=1, both the primary and secondary may also operate at the half-bridge mode, but full-bridge mode may be preferred for higher efficiency.

FIG. 11C illustrates an embodiment expanded 2*2 voltage conversion ratio table having the same conversion ratio values as that in FIG. 11B, while the primary side and the secondary side of the resonant converter have a two/three-level half-bridge topology. Note in FIG. 11C, for the case of VCRtot=1, both the primary side and secondary side may operate at the two-level half-bridge mode, but the three-level half-bridge mode may be preferred for better efficiency.

FIG. 11D illustrates another embodiment expanded 2*2 voltage conversion ratio table with different conversion ratio values from that in FIGS. 11B and 11C. In this case, the primary side of the resonant converter has a two/three-level half-bridge topology, while the secondary side of the resonant converter has a full-bridge/half-bridge topology. For the case of VCRtot=½, the primary side may operate at the three-level half-bridge mode and the secondary side may operate at the half-bridge mode, but full-bridge mode may be preferred for higher efficiency.

FIG. 11E illustrates another embodiment expanded 2*2 voltage conversion ratio table with different conversion ratio values from that in FIGS. 11B, 11C and 11D. In this case, the primary side of the resonant converter has a full-bridge/half-bridge topology, while the secondary side of the resonant converter has a two/three-level half-bridge topology. For the case of VCRtot=2, the primary side may also operate at the half-bridge mode and the secondary side may operate at the three-level half-bridge mode, but full-bridge mode may be preferred for high efficiency.

Corresponding to the same input voltage sub-ranges and output voltage sub-ranges, a plurality of such expanded voltage conversion ratio tables as shown in FIG. 11 may be built up as look-up tables. Each of the look-up tables includes a number of entries corresponding to the input voltage sub-ranges and output voltage sub-ranges, and each entry includes a voltage conversion ratio value, a corresponding operating mode for the primary side inverter and a corresponding operating mode for the secondary side rectifier. The tables may be indexed for searching convenience. In one embodiment, each table may be indexed by the topologies used on the primary side or the secondary side. One of ordinary skill in the art would recognize there may be many variations, alternatives, and modifications for arranging and building up the look-up tables. When the control circuit 750 has obtained the input and output voltage information for the AC/DC converter and determined the needed conversion ratio for the resonant converter, the control circuit may search the look-up tables according to the input and output voltage, the required conversion ratio and topologies of the primary side and secondary side to find the suitable operating modes for the primary side and the secondary side.

When the AC/DC converter 700 described above has reached a steady state, its output voltage is regulated and its feedback control loop is not saturated. The duty cycle of the non-isolated DC/DC converter will reflect the AC/DC converter's output voltage level demanded by the load, and may be used to select operating modes for the primary side and the secondary side of the resonant converter of the AC/DC converter in lieu of the output voltage level information. When the non-isolated DC/DC converter is a Buck converter, the output voltage of the AC/DC converter 700 can be represented by:

$$Vout=Vin*(Np/Ns)*VCRtot*D$$

where Vout is the output voltage of the AC/DC converter, Vin is the AC input voltage of the AC/DC converter, Np and Ns are the numbers of turns of the primary winding and the secondary winding of the transformer in the resonant converter, VCRtot is the voltage conversion ratio of the resonant converter, and D is the duty cycle of the non-isolated DC/DC converter. When a Boost converter is used as the non-isolated DC/DC converter, the output voltage is:

$$Vout=Vin*(Np/Ns)*VCRtot/(1-D)$$

For a Buck-Boost converter, the output voltage is:

$$Vout=Vin*(Np/Ns)*VCRtot*D/(1-D)$$

With such a relationship between the Vin, Vout, VCRtot and the duty cycle D of the non-isolated DC/DC converter, the duty cycle of the non-isolated DC/DC converter may be used to determine the operating modes for the primary side and the secondary side of the resonant converter of the AC/DC converter 700. Information about the duty cycle of the non-isolated DC/DC converter may be known to the control circuit 750, for example, when the duty cycle is measurable by the control circuit 750, or when the control circuit 750 is shared by the resonant converter and the non-isolated DC/DC converter. For example, the control circuit 750 may be a digital controller shared by the resonant converter and the non-isolated DC/DC converter.

When an AC/DC adaptor, or an AC/DC converter, is plugged in and powered initially, the input voltage may be detectable, but its output voltage setting level demanded by a load may be unknown yet. In this case, an initial operating mode for the primary side and secondary side of the AC/DC converter may be selected respectively according to the topology of the primary side and the secondary side and the type of the non-isolated DC/DC converter. For example, if the non-isolated DC/DC converter is a Buck converter, the primary and secondary side have a full-bridge/half-bridge topology, and the expanded 2*2 conversion ratio table in FIG. 11B is used as an example, one combination of operating modes in the first row of the 2*2 table, either in region 11 or 12, may be selected to use initially. The reason to make such selection to begin the initial power up is that the voltage conversion ratio VCRtot is higher in the first row than that in the second row of the 2*2 table. After the AC/DC converter reaches a steady state, the duty cycle of the Buck converter will tend to be smaller, thus the feedback control loop will not be saturated. If operating modes in the second row are selected initially, the Buck duty cycle may get too close to 1 after the AC/DC converter reaches a steady state, and the feedback control loop may be saturated. For the same reason, if the non-isolated DC/DC converter is a Boost converter, then one combination of operating modes in the second row of the 2*2 table in FIG. 11B may be selected in the initial power-up process. If the non-isolated DC/DC converter is a Buck-Boost converter, any combination of operating modes in the 2*2 table of FIG. 11B may be used for the initial power-up process, although the first row may be preferred in order to start with a smaller initial duty cycle for the Buck-Boost converter. The operating modes of the primary side and the secondary side may then be adjusted later during the power-up process.

Figure 12:
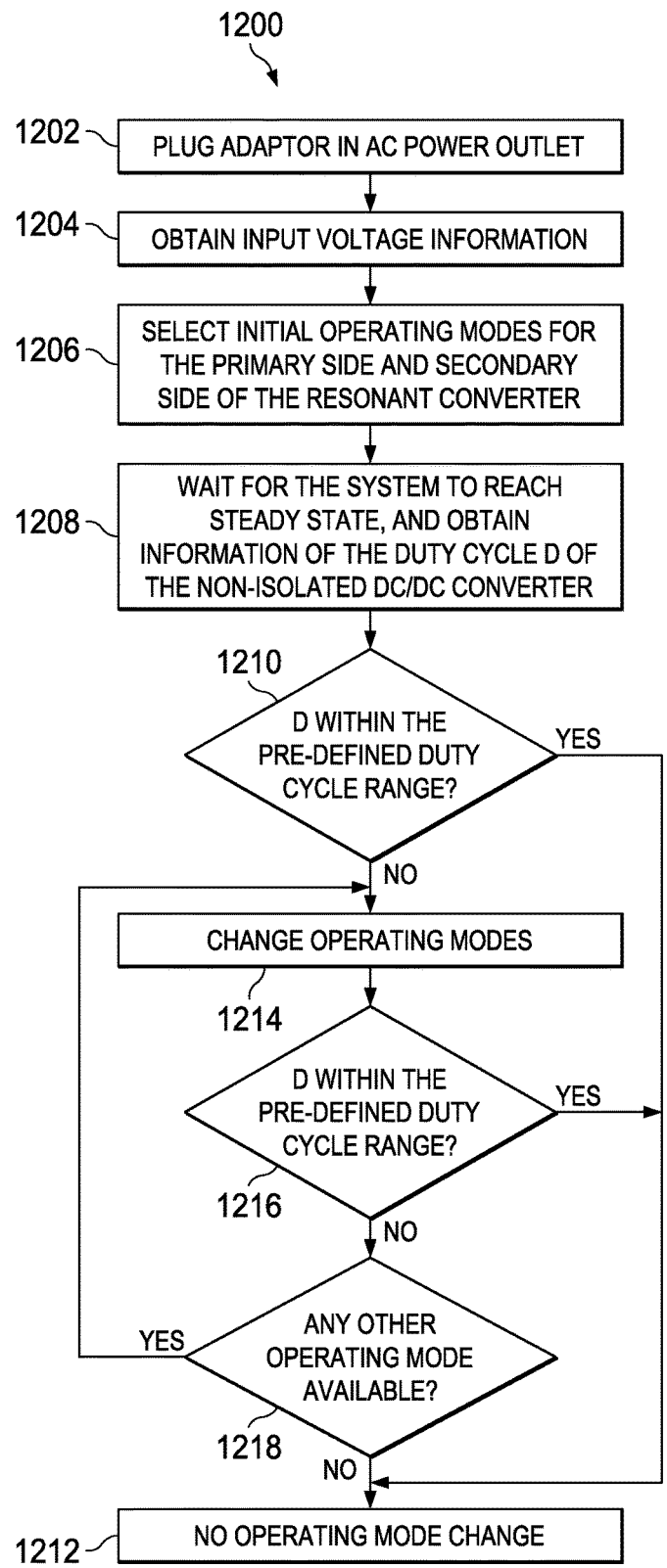
FIG. 12 illustrates a flow chart of another embodiment method for determining operating modes for the primary side and secondary side of the resonant converter of an AC/DC converter.

FIG. 12 illustrates a flow chart of an embodiment method 1200 for determining operating modes of the primary side and the secondary side of the resonant converter of the AC/DC converter 700. The method 1200 begins when the AC/DC adaptor is plugged in an AC power outlet at step 1202. The control circuit 750 obtains information about the input AC voltage at step 1204. The control circuit 750 selects at step 1206 an initial operating mode for the primary side and secondary side of the resonant converter of the AC/DC converter 700, respectively, according to the type of the non-isolated DC/DC converter and topologies of the primary side and the secondary side. For example, as discussed above, when the non-isolated DC/DC converter is a Buck converter, an initial operating mode may be selected from the first row of the conversion ratio table in FIG. 11B according to the sensed input voltage level, when both the primary side and secondary side have a full-bridge and half-bridge topology. Thus the primary side operates at a full-bridge mode and the secondary side operates at a half-bridge mode initially if Vin is below the threshold voltage Vith, or both the primary side and the secondary side operate at a full-bridge mode initially if Vin is above the threshold voltage Vith.

The control circuit will then, at step 1208, wait for the AC/DC converter to reach a steady state, and obtain the information about the duty cycle of the non-isolated DC/DC converter. The control circuit determines whether the primary side or the secondary side need switch to a different operating mode according to the duty cycle. When the AC/DC converter 700 reaches steady state, if the initially selected operating modes are not the right one, the steady state Buck duty cycle, for example, may be small and may fall below a pre-defined duty cycle range, which means a different operating mode for the primary side or the secondary side with a lower VCRtot may be used to boost the Buck duty cycle and improve the Buck stage efficiency. Therefore, at step 1210, the control circuit 750 may determine whether the obtained duty cycle D of the non-isolated DC/DC converter falls into a pre-defined duty cycle range. If the duty cycle D falls within the pre-defined duty cycle range, then the method goes to step 1212, where no operating modes need to be changed and the power-up process will continue until completed.

If the duty cycle D does not fall within the pre-defined duty cycle range, the control circuit, in this embodiment, may select a combination of operating modes that have a lower conversion ratio, which means the combination in the second row of the conversion ratio table in FIG. 11B, and switch the operating modes of the primary side and/or the secondary side according to the selection at step 1214. The control circuit continues, after the primary side and/or the secondary side have switched to a different combination of operating modes, to monitor the duty cycle of the non-isolated DC/DC converter, and determine whether the present duty cycle falls within the pre-defined duty cycle range at step 1216. In one embodiment, the Buck duty cycle D corresponding to each combination of operating modes in each conversion ratio table may be pre-calculated and stored. Thus the control circuit may directly retrieve the duty cycle information corresponding to a combination of operating modes, and determine whether the combination of operating modes may be selected by checking whether the duty cycle of the combination falls within the pre-defined duty cycle range. If the duty cycle D falls within the pre-defined duty cycle range, then the method goes to step 1212.

If the duty cycle is still outside of the pre-defined duty cycle range with the operating modes changed, e.g., if the duty cycle is still too low, the control circuit 750 may check at step 1218 whether there is any other combination of operating modes available with even lower VCRtot, so that the Buck duty cycle may be further optimized. If there is still such a combination available, the control circuit may continue to perform further operating mode change. Otherwise, the method goes to step 1212. When the AC/DC adaptor reaches a steady state after the initial power-up, it normally does not need to perform additional operating mode changes during its operation. This method may be used for the AC/DC adaptor to perform one-time operating mode selection for the initial power up of the AC/DC adaptor, and may also be used to perform on-the-fly operating mode adaptation when the adaptor is in operation.

Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

What is claimed is:

1. A converter, comprising:
   a first DC/DC converter comprising a transformer, a primary side inverter coupled to a primary side of the transformer, and a secondary side rectifier coupled to a secondary side of the transformer, wherein the primary side inverter or the secondary side rectifier operates at multiple operating modes comprising a full-bridge mode and a half-bridge mode;
   a second non-isolated DC/DC converter coupled to the first DC/DC converter sequentially, the second non-isolated DC/DC converter being a DC/DC converter without having an isolation transformer in a power train; and
   a control circuit coupled to the first DC/DC converter, configured to determine an operating mode for the primary side inverter and an operating mode for the secondary side rectifier, and change the operating mode of the primary side inverter or the secondary side rectifier, the control circuit determining the operating mode for the primary side inverter or the secondary side rectifier by: determining a first input voltage sub-range that an input voltage of the converter falls in, determining a second output voltage sub-range that an output voltage required of the converter falls in, and determining the operating mode for the primary side inverter or the secondary side rectifier according to a pre-determined mapping between a first combination and a second combination, wherein the first combination comprises the first input voltage sub-range and the second output voltage sub-range, and the second combination comprises the operating mode of the primary side inverter and the operating mode of the secondary side rectifier.

2. The converter of claim 1, wherein the first DC/DC converter is a resonant converter, a multi-level bridge converter, or a cascaded converter.

3. The converter of claim 1, wherein the control circuit is configured to switch the operating mode of the primary side inverter or the operating mode of the secondary side rectifier between the half-bridge mode and the full-bridge mode.

4. The converter of claim 1, wherein the primary side inverter or the secondary side rectifier comprises, respectively, a plurality of switches and at least one mode controlling switch by which the primary side inverter or the secondary side rectifier changes from a first operating mode to a second operating mode.

5. The converter of claim 4, wherein the secondary side rectifier changes from the first operating mode to the second operating mode by turning off at least one of the plurality of switches of the secondary side rectifier except the at least one mode controlling switch, changing gradually a duty cycle of the at least one mode controlling switch according to the second operating mode, and applying gate drives to the plurality of switches of the secondary side rectifier according to the second operating mode.

6. The converter of claim 1, wherein the secondary side rectifier comprises four switches, a first switch of the secondary side rectifier being coupled to a second switch of the secondary side rectifier in series, a third switch of the secondary side rectifier being coupled to a fourth switch of the secondary side rectifier in series, and the first switch and the second switch being coupled to the third switch and the fourth switch in parallel, wherein a common node of the first switch and the second switch is coupled to a first terminal of a secondary winding of the transformer through a capacitor, and wherein a common node of the third switch and the fourth switch is coupled to a second terminal of the secondary winding of the transformer, one of the four switches being a mode controlling switch by which the secondary side rectifier operates at the half-bridge mode or the full-bridge mode.

7. The converter of claim 1, wherein the first DC/DC converter further comprises a resonant tank coupled between the primary side inverter and the transformer, the primary side inverter comprising four switches, a first switch of the primary side inverter being coupled to a second switch of the primary side inverter in series, a third switch of the primary side inverter being coupled to a fourth switch of the primary side inverter in series, and the first switch and the second switch being coupled to the third switch and the fourth switch in parallel, wherein a common node of the first switch and the second switch is coupled to a first input terminal of the resonant tank, and a common node of the third switch and the fourth switch is coupled to a second input terminal of the resonant tank, one of the four switches being a mode controlling switch by which the primary side inverter operates at the half-bridge mode or a full bridge the full-bridge mode.

8. The converter of claim 1, wherein the second non-isolated DC/DC converter is a Buck converter, a Boost converter, or a Buck-Boost converter.

9. The converter of claim 1, wherein the second non-isolated DC/DC converter has a multi-level topology and is operable at a plurality of operating modes corresponding to the multi-level topology.

10. The converter of claim 9, wherein the control circuit is configured to control the second non-isolated DC/DC converter to operate at the plurality of operating modes.

11. The converter of claim 1, wherein the control circuit is configured to obtain information comprising the input voltage of the converter and the output voltage of the converter, and determine a voltage conversion ratio of the first DC/DC converter according to the information.

12. The converter of claim 1, wherein the control circuit is configured to select the pre-determined mapping from a plurality of mappings according to information comprising the input voltage of the converter, the output voltage of the converter, a voltage conversion ratio of the first DC/DC converter, and a topology of the primary side inverter or the secondary side rectifier.

13. The converter of claim 1, wherein the control circuit is configured to select the pre-determined mapping from a plurality of mappings indicated by a plurality of look-up tables, each of the plurality of look-up tables comprising a number of entries, and each entry comprising a voltage conversion ratio of the first DC/DC converter, a corresponding operating mode for the primary side inverter and a corresponding operating mode for the secondary side rectifier in accordance with a pair of input and output voltages of the converter.

14. The converter of claim 1, wherein the control circuit is configured to determine the operating mode for the primary side inverter or the secondary side rectifier according to a duty cycle of the second non-isolated DC/DC converter.

15. The converter of claim 1, wherein the control circuit is further configured to:
determine whether a duty cycle of the second non-isolated DC/DC converter is within a pre-determined range when the primary side inverter or the secondary side rectifier is operating at a first operating mode; and
change the primary side inverter or the secondary side rectifier to a second operating mode if the duty cycle of the second non-isolated DC/DC converter is not within the pre-determined range.

16. The converter of claim 15, wherein the control circuit is further configured to select the operating mode for the primary side inverter or the secondary side rectifier when the output voltage of the converter is unknown.

17. A method, comprising:
providing a signal to a converter, the converter comprising a first DC/DC converter coupled to a second non-isolated DC/DC converter, wherein the first DC/DC converter comprises a primary side inverter coupled to a primary side of a transformer and a secondary side rectifier coupled to a secondary side of the transformer, the primary side inverter or the secondary side rectifier operable at multiple operating modes comprising a full-bridge mode and a half-bridge mode; and
switching the primary side inverter or the secondary side rectifier from a first operating mode to a second operating mode in response to a determination that is made based on a pre-determined mapping between a first combination and a second combination, the first combination comprising an input voltage sub-range that an input voltage of the converter falls in and an output voltage sub-range that an output voltage required of the converter falls in, and the second combination comprising an operating for the primary side inverter and an operating mode for the secondary side rectifier.

18. The method of claim 17, further comprising:
determining the second operating mode for the primary side inverter or the secondary side rectifier based on the pre-determined mapping.

19. The method of claim 18, wherein determining the second operating mode for the primary side inverter or the secondary side rectifier comprises determining the pre-determined mapping according to information comprising the input voltage of the converter, the output voltage of the converter, a voltage conversion ratio of the first DC/DC converter, and a topology of the primary side inverter or the secondary side rectifier.

20. The method of claim 18, wherein determining the second operating mode for the primary side inverter or the secondary side rectifier further comprises determining the second operating mode for the primary side inverter or the secondary side rectifier according to a duty cycle of the second non-isolated DC/DC converter.

21. The method of claim 20, further comprising:
determining whether the duty cycle of the second non-isolated DC/DC converter is within a pre-determined range when the primary side inverter or the secondary side rectifier is operating at the first operating mode; and
switching the primary side inverter or the secondary side rectifier to the second operating mode if the duty cycle of the second non-isolated DC/DC converter is not within the pre-determined range.

22. The method of claim 21, further comprising:
selecting the second operating mode for the primary side inverter or the secondary side rectifier when an output voltage of the converter is unknown.

23. The method of claim 18, wherein determining the second operating mode for the primary side inverter or the secondary side rectifier comprises determining the second operating mode for the primary side inverter or the secondary side rectifier according to a plurality of look-up tables, each of the plurality of look-up tables comprising a number of entries, and each entry comprising a voltage conversion ratio of the first DC/DC converter, a corresponding operating mode for the primary side inverter and a corresponding operating mode for the secondary side rectifier in accordance with a pair of input and output voltages of the converter.

24. A circuit, comprising:
a first DC/DC converter comprising a transformer, a primary side inverter coupled to a primary side of the transformer, and a secondary side rectifier coupled to a secondary side of the transformer, wherein the primary side inverter or the secondary side rectifier operates at multiple operating modes comprising a full-bridge mode and a half-bridge mode;
a second non-isolated DC/DC converter coupled to the first DC/DC converter sequentially, the second non-isolated DC/DC converter being a DC/DC converter without having an isolation transformer in a power train; and
a control circuit coupled to the first DC/DC converter, configured to determine an operating mode for the primary side inverter and an operating mode for the secondary side rectifier, and change the operating mode of the primary side inverter or the operating mode of the secondary side rectifier, the control circuit determining the operating mode for the primary side inverter or the secondary side rectifier according to a first mapping in a plurality of mappings, wherein each of the plurality of mappings maps a first combination to a second combination, the first combination comprising an input voltage sub-range and an output voltage sub-range of the circuit, and the second combination comprising the operating mode of the primary side inverter and the operating mode of the secondary side rectifier.

25. The circuit of claim 24, wherein the first DC/DC converter is a resonant converter, a multi-level bridge converter, or a cascaded converter.

26. The circuit of claim 24, wherein the primary side inverter or the secondary side rectifier comprises, respectively, a plurality of switches and at least one mode controlling switch by which the primary side inverter or the secondary side rectifier changes from a first operating mode to a second operating mode.

27. The circuit of claim 26, wherein the secondary side rectifier changes from the first operating mode to the second operating mode by turning off at least one of the plurality of switches of the secondary side rectifier except the at least one mode controlling switch, changing gradually a duty cycle of the at least one mode controlling switch according to the second operating mode, and applying gate drives to the plurality of switches of the secondary side rectifier according to the second operating mode.

28. The circuit of claim 24, wherein the secondary side rectifier comprises four switches, a first switch of the secondary side rectifier being coupled to a second switch of the secondary side rectifier in series, a third switch of the secondary side rectifier being coupled to a fourth switch of the secondary side rectifier in series, and the first switch and the second switch being coupled to the third switch and the fourth switch in parallel, wherein a common node of the first switch and the second switch is coupled to a first terminal of a secondary winding of the transformer through a capacitor, and wherein a common node of the third switch and the fourth switch is coupled to a second terminal of the secondary winding of the transformer, one of the four switches being a mode controlling switch by which the secondary side rectifier operates at the half-bridge mode or the full-bridge mode.

29. The circuit of claim 24, wherein the first DC/DC converter further comprises a resonant tank coupled between the primary side inverter and the transformer, the primary side inverter comprising four switches, a first switch of the primary side inverter being coupled to a second switch of the primary side inverter in series, a third switch of the primary side inverter being coupled to a fourth switch of the primary side inverter in series, and the first switch and the second switch being coupled to the third switch and the fourth switch in parallel, wherein a common node of the first switch and the second switch is coupled to a first input terminal of the resonant tank, and a common node of the third switch and the fourth switch is coupled to a second input terminal of the resonant tank, one of the four switches being a mode controlling switch by which the primary side inverter operates at the half-bridge mode or the full-bridge mode.

30. The circuit of claim 24, wherein the second non-isolated DC/DC converter is a Buck converter, a Boost converter, or a Buck-Boost converter.

31. The circuit of claim 24, wherein the control circuit is configured to control the second non-isolated DC/DC converter to operate at multiple operating modes of the second non-isolated DC/DC converter.

32. The circuit of claim 24, wherein the control circuit is configured to obtain information comprising an input voltage of the circuit and an output voltage of the circuit, and determine a voltage conversion ratio of the first DC/DC converter according to the information.

33. The circuit of claim 24, wherein the control circuit is configured to determine the operating mode for the primary side inverter or the secondary side rectifier according to a duty cycle of the second non-isolated DC/DC converter.

34. The circuit of claim 24, wherein the control circuit is further configured to:
  determine whether a duty cycle of the second non-isolated DC/DC converter is within a pre-determined range when the primary side inverter or the secondary side rectifier is operating at a first operating mode; and
  change the primary side inverter or the secondary side rectifier to a second operating mode if the duty cycle of the second non-isolated DC/DC converter is not within the pre-determined range.

35. An apparatus, comprising:
  an AC/DC converter, the AC/DC converter comprising:
    a first DC/DC converter comprising a transformer, a primary side inverter coupled to a primary side of the transformer, and a secondary side rectifier coupled to a secondary side of the transformer, wherein the primary side inverter or the secondary side rectifier operates at multiple operating modes comprising a full-bridge mode and a half-bridge mode;
    a second non-isolated DC/DC converter coupled to the first DC/DC converter sequentially, the second non-isolated DC/DC converter being a DC/DC converter without having an isolation transformer in a power train; and
    a control circuit coupled to the first DC/DC converter, configured to determine an operating mode for the primary side inverter and an operating mode for the secondary side rectifier, and change the operating mode of the primary side inverter or the secondary side rectifier, the control circuit determining the operating mode for the primary side inverter and the operating mode for the secondary side rectifier according to a pre-determined mapping between a first combination and a second combination, wherein the first combination comprises an input voltage sub-range that an input voltage of the AC/DC converter falls in and an output voltage sub-range that an output voltage of the AC/DC converter falls in, and the second combination comprises the operating mode of the primary side inverter and the operating mode of the secondary side rectifier.

36. The apparatus of claim 35, wherein the first DC/DC converter is a resonant converter, a multi-level bridge converter, or a cascaded converter.

37. The apparatus of claim 35, wherein the second non-isolated DC/DC converter is a Buck converter, a Boost converter, or a Buck-Boost converter.

38. A method, comprising:
  determining an operating mode for a converter, the converter comprising a first DC/DC converter coupled to a second non-isolated DC/DC converter, wherein the first DC/DC converter comprises a primary side inverter coupled to a primary side of a transformer and a secondary side rectifier coupled to a secondary side of the transformer, the primary side inverter or the secondary side rectifier operable at multiple operating modes comprising a full-bridge mode and a half-bridge mode, determining the operating mode of the converter comprising determining an operating mode of the primary side inverter and an operating mode of the secondary side rectifier according to a pre-determined mapping between a first combination and a second combination, wherein the first combination comprises an input voltage sub-range and an output voltage sub-range of the converter, and the second combination comprises the operating mode of the primary side inverter and the operating mode of the secondary side rectifier, wherein the input voltage sub-range is determined based on an input voltage of the converter, and the output voltage sub-range is determined based on an output voltage of the converter; and switching the primary side inverter or the secondary side rectifier between the full-bridge mode and the half-bridge mode according to the determined operating mode of the primary side inverter and the operating mode of the secondary side rectifier.

39. The method of claim 38, wherein the first DC/DC converter is a resonant converter, a multi-level bridge converter, or a cascaded converter.

* * * * *